United States Patent
Oguma

(10) Patent No.: US 11,203,274 B2
(45) Date of Patent: Dec. 21, 2021

(54) ELECTRICALLY DRIVEN VEHICLE

(71) Applicant: Honda Motor Co.,Ltd., Tokyo (JP)

(72) Inventor: Hirokazu Oguma, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 16/589,023

(22) Filed: Sep. 30, 2019

(65) Prior Publication Data
US 2020/0108733 A1   Apr. 9, 2020

(30) Foreign Application Priority Data
Oct. 9, 2018   (JP) .............................. JP2018-190831

(51) Int. Cl.
| H02J 7/00 | (2006.01) |
| B60L 58/18 | (2019.01) |
| B60W 20/14 | (2016.01) |
| B60W 30/18 | (2012.01) |
| H02K 47/04 | (2006.01) |

(52) U.S. Cl.
CPC .............. B60L 58/18 (2019.02); B60W 20/14 (2016.01); B60W 30/18127 (2013.01); H02J 7/007 (2013.01); H02K 47/04 (2013.01)

(58) Field of Classification Search
CPC ...... H02J 7/0024; H02J 7/0014; H02J 7/0013; H02J 7/007; B60L 58/18; B60L 53/00; B60L 53/50; B60L 53/51; B60L 53/52; B60L 53/53; B60L 53/54; B60L 53/55; B60L 53/56; B60L 53/57; B60L 53/67; B60L 53/68; B60L 53/10; B60L 53/62; B60L 53/66; B60W 20/14; B60W 30/18127; H02K 47/04

USPC .......... 320/104, 109, 116; 307/2, 4, 8, 10.1, 307/11–87
See application file for complete search history.

(56) References Cited

U.S. PATENT DOCUMENTS

| 2004/0201365 A1* | 10/2004 | Dasgupta ................ B60L 58/21 320/116 |
| 2016/0185252 A1* | 6/2016 | Kwon ..................... B60L 58/30 307/10.1 |
| 2018/0342881 A1* | 11/2018 | Schmitz .................. B60L 58/19 |

FOREIGN PATENT DOCUMENTS

JP   2011063145   3/2011

* cited by examiner

*Primary Examiner* — Richard Isla
*Assistant Examiner* — Mohammed J Sharief
(74) *Attorney, Agent, or Firm* — JCIPRNET

(57) ABSTRACT

A vehicle includes an inverter, a first battery, a first power line, a second battery, a second power line, and a voltage converter. Ranges of use with respect to open circuit voltages of the first battery and the second battery do not overlap each other, and ranges of use with respect to closed circuit voltages of the first and the second batteries overlap each other. When a regenerative power output from the inverter to the first power line is supplied to the second power line via the voltage converter, and the second battery is charged, an ECU calculates a maximum regenerative power with respect to the regenerative power output from the inverter to the first power line based on the open circuit voltage of the first battery and controls the inverter and the voltage converter such that the regenerative power does not exceed the maximum regenerative power.

15 Claims, 12 Drawing Sheets

ELECTRICALLY DRIVEN VEHICLE

CROSS-REFERENCE TO RELATED APPLICATION

This application claims the priority of Japan patent application serial no. 2018-190831, filed on Oct. 9, 2018. The entirety of the above-mentioned patent application is hereby incorporated by reference herein and made a part of this specification.

BACKGROUND

Technical Field

The present disclosure relates to an electrically driven vehicle. More specifically, the present disclosure relates to an electrically driven vehicle including two power storage devices differing from each other in a range of use with respect to a voltage, and a voltage converter converting a voltage between circuits in which these two power storage devices are provided.

Description of Related Art

Electrically driven vehicles travel by supplying power stored in a power storage device such as a secondary battery or a capacitor to a drive motor and rotating a driving wheel. In addition, in an electrically driven vehicle, the drive motor functions as a generator during deceleration so that a regenerative braking force is applied to the driving wheels to decelerate the electrically driven vehicle and the power storage device is charged using a regenerative power generated by the drive motor.

In an electrically driven vehicle in Patent Document 1 (Japanese Patent Laid-Open No. 2011-63145), in consideration of the fact that a power storage device cannot receive a regenerative power in a case of a high remaining capacitance, when the remaining capacitance is high and the deviation between a target regenerative braking force and an actual regenerative braking force is significant, the shortage of the braking force is supplemented by operating a mechanical brake.

Incidentally, in recent years, electrically driven vehicles which include two or more power storage devices differing from each other in a range of use of a voltage and in which the power storage devices are separately used in accordance with their states have been proposed. In many electrically driven vehicles including a plurality of power storage devices in this manner, circuits which have different voltages and are provided with these power storage devices are connected to at least one voltage converter, and charging and discharging of each of the power storage devices are controlled by adjusting the voltage between the circuits using this voltage converter.

In addition, a closed-circuit voltage of a power storage device varies depending on the remaining capacitance of the power storage device or the magnitude of a charging current or a discharging current flowing in the power storage device. Therefore, even when ranges of use with respect to an open-circuit voltage of the power storage devices do not overlap each other, there are cases where ranges of use with respect to the closed-circuit voltage overlap each other. Therefore, when charging or discharging is performed, for example, in a state where the closed-circuit voltages of two power storage devices are approximate to each other, there are cases where the voltage converter does not appropriately operate and a charging current or a discharging current flows to an unintended power storage device. However, in Patent Document 1, such a problem is not sufficiently investigated.

SUMMARY

The present disclosure provides an electrically driven vehicle in which a charging current or a discharging current can be prevented from flowing into an unintended power storage device of two power storage devices differing from each other in a range of use with respect to a voltage.

According to an embodiment of the present disclosure, there is provided an electrically driven vehicle is provided to include an electric motor that is coupled to a driving wheel, a power converter that transmits and receives a power with respect to the electric motor, a first circuit to which the power converter and a first power storage device are connected, a second circuit to which a second power storage device is connected, a voltage converter that converts a voltage between the first circuit and the second circuit, and a control device that controls the power converter and the voltage converter. In addition, a range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device. The control device performs controls in a manner when one of the first and second power storage devices serves as a charging target power storage device, the other serves as a non-charging target power storage device, a regenerative power output from the power converter to the first circuit is supplied to the charging target power storage device, and the charging target power storage device is charged, the control device calculates an upper limit power with respect to the regenerative power output from the power converter to the first circuit based on an open-circuit voltage of the non-charging target power storage device and controls the power converter and the voltage converter such that the regenerative power does not exceed the upper limit power.

According to another embodiment of the present disclosure, an electrically driven vehicle (for example, a vehicle V as described above) is provide to include an electric motor that is coupled to a driving wheel, a power converter that transmits and receives a power with respect to the electric motor, a first circuit to which the power converter and a first power storage device are connected, a second circuit to which a second power storage device is connected, a voltage converter that converts a voltage between the first circuit and the second circuit, and a control device that controls the power converter and the voltage converter. In addition, a range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device. The control device performs controls in a manner when one of the first and second power storage devices serves as a discharging target power storage device, the other serves as a non-discharging target power storage device, a power output from the discharging target power storage device is supplied to the power converter, and the electric motor is driven, the control device calculates an upper limit power with respect to a driving power output from the first circuit to the power converter based on an open-circuit voltage of the non-discharging target power storage device and controls the power converter and the voltage converter such that the driving power does not exceed the upper limit power.

DESCRIPTION OF THE EMBODIMENTS

First Embodiment

Figure 1:
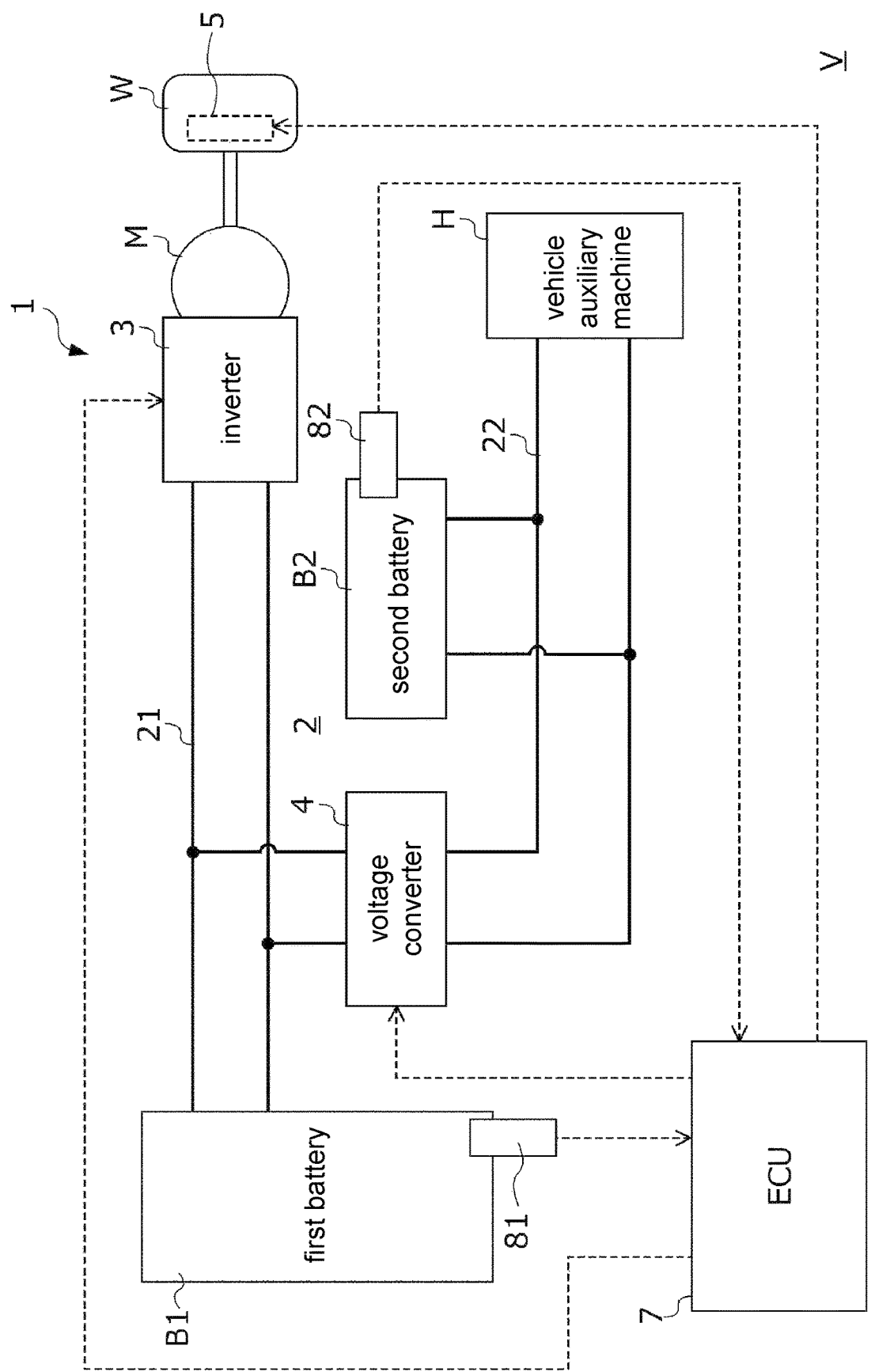
FIG. 1 is a view illustrating a configuration of an electrically driven vehicle according to the first embodiment of the present disclosure.

Hereinafter, the first embodiment of the present disclosure will be described with reference to the drawings. FIG. 1 is a view illustrating a configuration of an electrically driven vehicle V (which will hereinafter be simply referred to as "a vehicle") according to the present embodiment. The vehicle V includes a power supply system 1, a drive motor M that is an electric motor, a mechanical braking device 5, a driving wheel W, and an electronic control device 7 (hereinafter, an abbreviation of "ECU" will be used) which controls the power supply system 1, the drive motor M, and the mechanical braking device 5. The control device (ECU) 7 may include a processor (or processing circuit, CPU) and its cooperative components or circuit such as memory (ROM, RAM, etc.) to executes control programs for controlling the operations of the respective components of the vehicle V and carry out control processes described below.

The drive motor M mainly generates a dynamic force for the vehicle V to travel. An output shaft of the drive motor M is coupled to the driving wheel W via a dynamic force transmission mechanism (not illustrated). A torque generated by the drive motor M by supplying a power from the power supply system 1 to the drive motor M is transmitted to the driving wheels W via the dynamic force transmission mechanism (not illustrated), rotates the driving wheels W, and allows the vehicle V to travel. In addition, the drive motor M acts as a generator when the vehicle V decelerates, so that a regenerative power is generated and a regenerative braking force corresponding to the magnitude of this regenerative power is applied to the driving wheels W. A regenerative power generated by the drive motor M charges a first battery B1 or a second battery B2 (which will be described below) included in the power supply system 1.

The mechanical braking device 5 is configured by a disk brake system applying a mechanical braking force generated due to friction to the driving wheels W. The ECU 7 sets a target for a braking force to be applied from the mechanical braking device 5 to the driving wheels W by performing cooperative control processing which will be described below (refer to FIG. 4 which will be described below) and in which a regenerative braking force applied from the drive motor M to the driving wheels W and a mechanical braking force applied from the mechanical braking device 5 to the driving wheels W cooperate with each other. The mechanical braking device 5 decelerates the vehicle V by applying a mechanical braking force corresponding to the target set in this cooperative control processing to the driving wheels W.

The power supply system 1 includes the first battery B1 serving as a first power storage device and the second battery B2 serving as a second power storage device which supply a power to the drive motor M, a vehicle auxiliary machine H which serves as an electric load for consuming a power, and a power circuit 2 in which the batteries B1 and B2 and the drive motor M are provided.

The first battery B1 is a secondary battery capable of performing both discharging in which chemical energy is converted into electric energy and charging in which electric energy is converted into chemical energy. Hereinafter, a case where a so-called lithium ion battery performing charging and discharging by moving lithium ions between electrodes is used as this first battery B1 will be described. However, the present disclosure is not limited thereto.

In the first battery B1, a first battery sensor unit 81 is provided to estimate the internal state of the first battery B1. The first battery sensor unit 81 is configured by a plurality of sensors for detecting the physical quantities necessary for the ECU 7 to acquire the charging rate, the temperature, and the like of the first battery B1 and transmitting a signal corresponding to a detection value to the ECU 7. More specifically, the first battery sensor unit 81 is configured by a voltage sensor for detecting the terminal voltage of the first battery B1, a current sensor for detecting the current flowing in the first battery B1, a temperature sensor for detecting the temperature of the first battery B1, and the like.

The ECU 7 calculates various parameters indicating the internal state of the first battery B1, based on a known algorithm using detection values transmitted from the first battery sensor unit 81. More specifically, the ECU 7 calculates the value of internal resistance of the first battery B1, the open-circuit voltage of the first battery B1, the closed-circuit voltage of the first battery B1, the charging rate indicating the power storage amount of the first battery B1 as a percentage, and the like.

The second battery B2 is a secondary battery capable of performing both discharging in which chemical energy is converted into electric energy and charging in which electric energy is converted into chemical energy. Hereinafter, a case where a so-called lithium ion battery performing charging and discharging by moving lithium ions between electrodes is used as this second battery B2 will be described. However, the present disclosure is not limited thereto. For example, a capacitor may be used as the second battery B2.

In the second battery B2, a second battery sensor unit 82 is provided to estimate the internal state of the second battery B2. The second battery sensor unit 82 is configured by a plurality of sensors for detecting the physical quantities necessary for the ECU 7 to acquire the charging rate, the temperature, and the like of the second battery B2 and transmitting a signal corresponding to a detection value to the ECU 7. More specifically, the second battery sensor unit 82 is configured by a voltage sensor for detecting the terminal voltage of the second battery B2, a current sensor for detecting the current flowing in the second battery B2, a temperature sensor for detecting the temperature of the second battery B2, and the like.

The ECU 7 calculates various parameters indicating the internal state of the second battery B2, based on a known algorithm using detection values transmitted from the second battery sensor unit 82. More specifically, the ECU 7 calculates the value of internal resistance of the second battery B2, the open-circuit voltage of the second battery B2, the closed-circuit voltage of the second battery B2, the charging rate indicating the power storage amount of the second battery B2 as a percentage, and the like.

Here, the properties of the first battery B1 and the properties of the second battery B2 will be compared to each other. The first battery B1 has a lower output weight density and a higher energy weight density than the second battery B2. That is, the first battery B1 is superior to the second battery B2 in regard to the energy weight density. In addition, the second battery B2 is superior to the first battery B1 in regard to the output weight density. The energy weight density indicates a power amount [Wh/kg] per unit weight, and the output weight density indicates a power [W/kg] per unit weight. Therefore, the first battery B1 having an excellent energy weight density is a capacitance-type power storage device mainly intended for a high capacitance, and the second battery B2 having an excellent output weight density is an output-type power storage device mainly intended for a high output.

Figure 2:
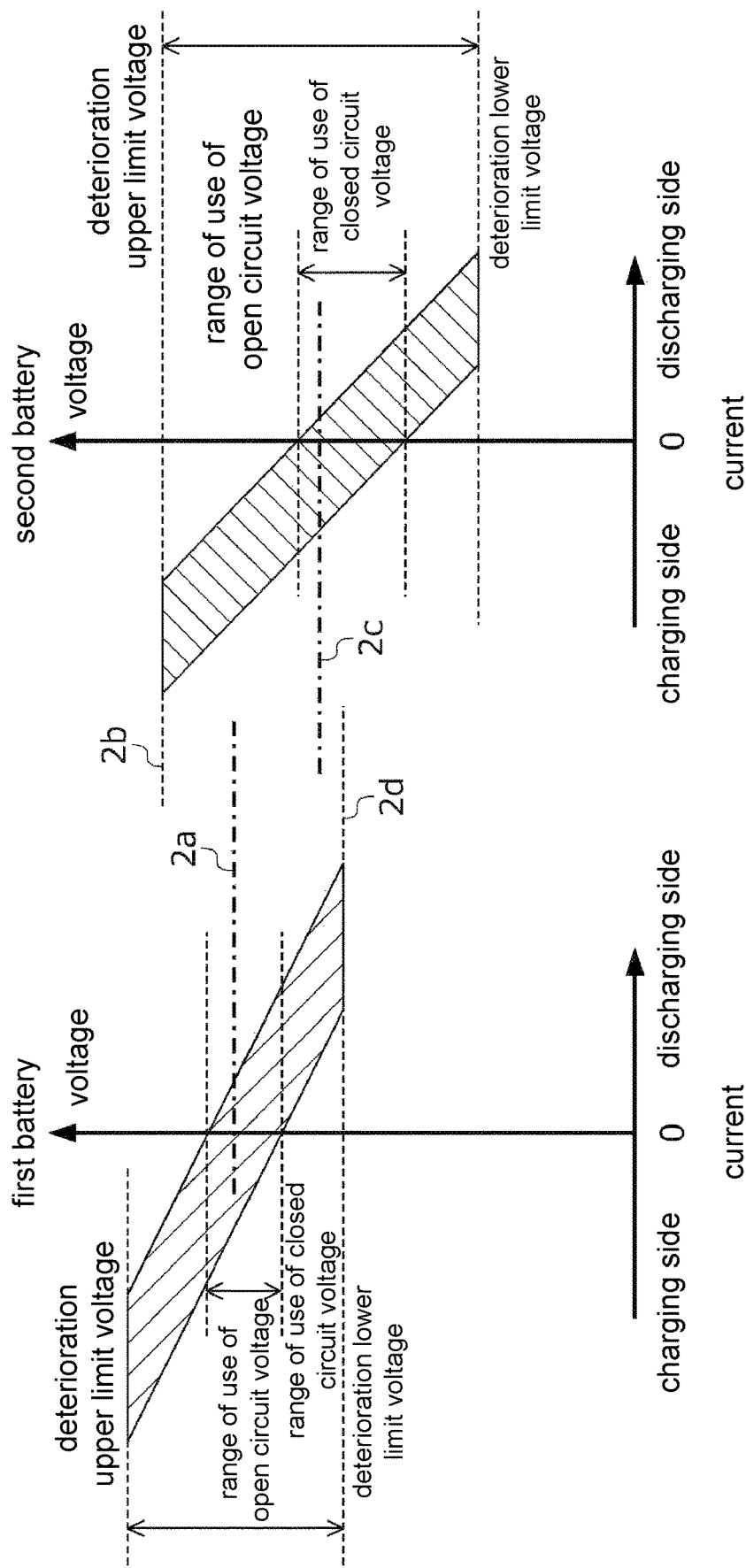
FIG. 2 is a view comparing ranges of use of a voltage of a first battery and a second battery.

FIG. 2 is a view comparing ranges of use of a voltage of the first battery B1 and the second battery B2 in the power supply system 1. In FIG. 2, the left side is a view illustrating the range of use of a voltage of the first battery B1, and the right side is a view illustrating the range of use of a voltage of the second battery B2. In FIG. 2, the horizontal axis indicates a current flowing in the battery, and the vertical axis indicates a voltage of the battery.

As illustrated in FIG. 2, the open-circuit voltages of the batteries B1 and B2 have properties of increasing when the charging rate increases. Therefore, the upper limits for the ranges of use of the open-circuit voltage of the batteries B1 and B2 are the open-circuit voltages thereof when the charging rate is at the maximum value (for example, 100%), and the lower limits are the open-circuit voltages thereof when the charging rate is at the minimum value (for example, 0%). As illustrated in FIG. 2, the range of use with respect to the open-circuit voltage of the first battery B1 does not overlap the range of use with respect to the open-circuit voltage of the second battery B2. In addition, in the present embodiment, as illustrated in FIG. 2, a case where the range of use with respect to the open-circuit voltage of the first battery B1 is higher than the range of use with respect to the open-circuit voltage of the second battery B2 will be described.

As illustrated in FIG. 2, the closed-circuit voltages of the batteries B1 and B2 also have properties of increasing when the charging rate increases. In addition, since an internal resistance is present in the batteries B1 and B2, the closed-circuit voltages thereof have properties of decreasing when the discharging current increases and increasing when the charging current increases. Therefore, the upper limits for the ranges of use of the closed-circuit voltage of the batteries B1 and B2 are higher than the upper limits for the ranges of use of the open-circuit voltage thereof, and the lower limits are lower than the lower limits for the ranges of use of the open-circuit voltage thereof. In other words, the ranges of use of the closed-circuit voltage of the batteries B1 and B2 include the ranges of use of the open-circuit voltage thereof. As illustrated in FIG. 2, the range of use with respect to the closed-circuit voltage of the first battery B1 overlaps the range of use with respect to the closed-circuit voltage of the second battery B2. More specifically, the range of use with respect to the closed-circuit voltage of the second battery B2 overlaps the range of use with respect to the open-circuit voltage of the first battery B1.

In addition, when the charging current increases excessively, deterioration of the batteries B1 and B2 is accelerated. Therefore, the upper limits for the ranges of use of the closed-circuit voltage of the batteries B1 and B2 are set based on the states of the batteries B1 and B2 such that the batteries B1 and B2 do not deteriorate. Hereinafter, the upper limits for the ranges of use of the closed-circuit voltage of the batteries B1 and B2 will also be referred to as deterioration upper limit voltages.

In addition, when the discharging current increases excessively, deterioration of the batteries B1 and B2 is accelerated. Therefore, the lower limits for the ranges of use of the closed-circuit voltage of the batteries B1 and B2 are set based on the states of the batteries B1 and B2 such that the batteries B1 and B2 do not deteriorate. Hereinafter, the lower limits for the ranges of use of the closed-circuit voltage of the batteries B1 and B2 will also be referred to as deterioration lower limit voltages.

Return to FIG. 1, the power circuit 2 includes an inverter 3 which transmits and receives a power with respect to the drive motor M, a first power line 21 which serves as a first circuit connecting a DC input/output terminal of this inverter 3 and the first battery B1 to each other, a second power line 22 which serves as a second circuit to which the second battery B2 and the vehicle auxiliary machine H are connected, and a voltage converter 4 connecting the second power line 22 and the first power line 21 to each other.

The inverter 3 is a PWM inverter for pulse width modulation including a bridge circuit configured by a plurality of switching elements (for example, IGBTs) subjected to bridge connection, for example, and has a function of converting between a DC power and an AC power. The inverter 3 is connected to the first power line 21 on its DC input/output side and is connected to coils of a U-phase, a V-phase, and a W-phase of the drive motor M on its AC input/output side. The inverter 3 performs ON/OFF driving of the switching element of each phase in accordance with a gate drive signal generated from a gate drive circuit (not illustrated) of the ECU 7 at a predetermined timing and converts a DC power in the first power line 21 into a three-phase AC power, which is thereby supplied to the drive motor M or converts a three-phase AC power supplied from the drive motor M into a DC power, which is thereby supplied to the first power line 21.

Figure 3:
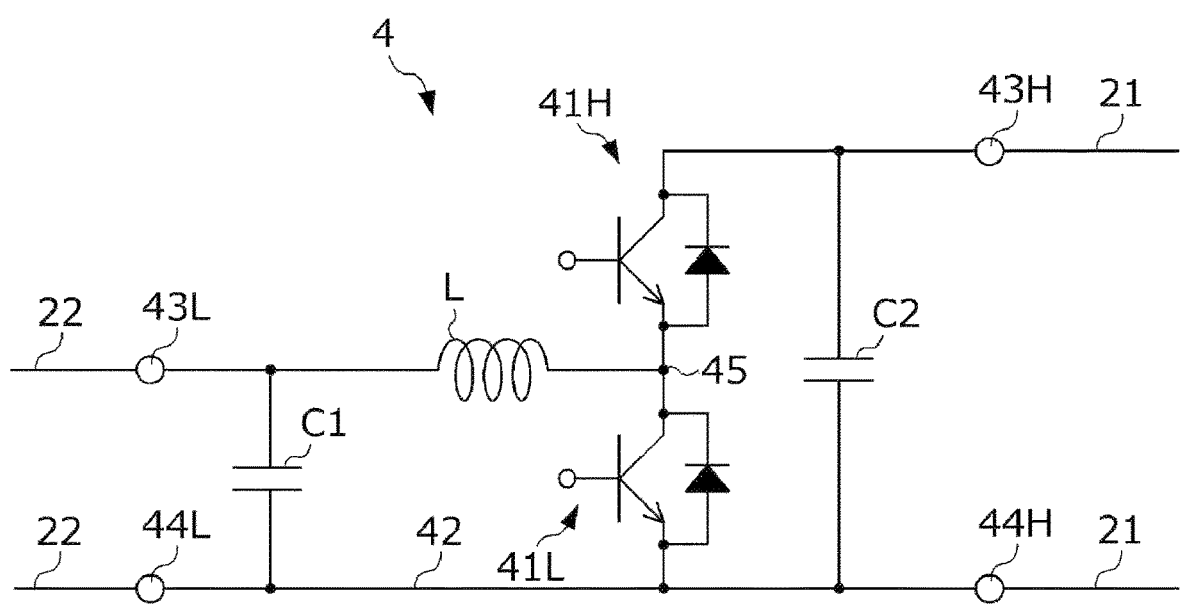
FIG. 3 is a view illustrating a circuit configuration of a voltage converter.

FIG. 3 is a view illustrating a circuit configuration of the voltage converter 4. The voltage converter 4 connects the first power line 21 to which the first battery B1 is connected and the second power line 22 to which the second battery B2 is connected and converts a voltage between the first power line 21 and the second power line 22. The voltage converter 4 is a bidirectional DC/DC converter and has a configuration of a combination of a reactor L, a first smoothing capacitor C1, a second smoothing capacitor C2, a high arm element 41H, a low arm element 41L, a negative bus 42, low voltage-side terminals 43L and 44L, and high voltage-side terminals 43H and 44H.

The low voltage-side terminals 43L and 44L are connected to the second power line 22, and the high voltage-side terminals 43H and 44H are connected to the first power line 21. The negative bus 42 is a wiring connecting the low voltage-side terminal 44L and the high voltage-side terminal 44H to each other. In the first smoothing capacitor C1, one end side thereof is connected to the low voltage-side terminal 43L, and the other end side thereof is connected to the negative bus 42. In the reactor L, one end side thereof is connected to the low voltage-side terminal 43L, and the other end side thereof is connected to a connection node 45 between the high arm element 41H and the low arm element 41L. In the second smoothing capacitor C2, one end side thereof is connected to the high voltage-side terminal 43H, and the other end side thereof is connected to the negative bus 42.

The high arm element 41H includes a known power switching element such as an IGBT or an MOSFET, and a free-wheeling diode which is connected to this power switching element in parallel. The low arm element 41L includes a known power switching element such as an IGBT or an MOSFET, and a free-wheeling diode which is connected to this power switching element in parallel. The high arm element 41H and the low arm element 41L are connected between the high voltage-side terminal 43H and the negative bus 42 in series in this order.

A collector of the power switching element of the high arm element 41H is connected to the high voltage-side terminal 43H, and an emitter thereof is connected to a collector of the low arm element 41L. An emitter of the power switching element of the low arm element 41L is connected to the negative bus 42. The forward direction of the free-wheeling diode provided in the high arm element 41H is a direction toward the high voltage-side terminal 43H from the reactor L. In addition, the forward direction of the free-wheeling diode provided in the low arm element 41L is a direction toward the reactor L from the negative bus 42.

The voltage converter 4 performs ON/OFF driving of the high arm element 41H and the low arm element 41L in accordance with the gate drive signal generated from the gate drive circuit (not illustrated) of the ECU 7 at a predetermined timing and coverts a voltage between the first power line 21 and the second power line 22.

As described with reference to FIG. 2, in the present embodiment, the range of use with respect to the open-circuit voltage of the first battery B1 is higher than and does not overlap with the range of use with respect to the open-circuit voltage of the second battery B2. Therefore, basically, the voltage of the first power line 21 is higher than the voltage of the second power line 22. Here, when the drive motor M is driven using both a power discharged from the first battery B1 and a power discharged from the second battery B2, the ECU 7 drives the voltage converter 4 to exhibit a step-up function. The step-up function denotes a function of stepping up a power in the second power line 22 to which the low voltage-side terminals 43L and 44L are connected and outputting the stepped-up power to the first power line 21 to which the high voltage-side terminals 43H and 44H are connected. Accordingly, a current flows from the second power line 22 side to the first power line 21 side. In addition, when discharging of the second battery B2 is inhibited and the drive motor M is driven using only a power discharged from the first battery B1, the ECU 7 turns off the voltage converter 4 such that no current flows from the first power line 21 to the second power line 22. However, in this case, when the voltage of the second power line 22 becomes higher than the voltage of the first power line 21, there are cases where the second battery B2 is turned to discharging and a current flows from the second power line 22 to the first power line 21 via the free-wheeling diode of the high arm element 41H.

In addition, when the first battery B1 or the second battery B2 is charged using a regenerative power output from the drive motor M to the first power line 21 during deceleration, the ECU 7 causes the voltage converter 4 to exhibit a step-down function. The step-down function denotes a function of stepping down a power in the first power line 21 to which the high voltage-side terminals 43H and 44H are connected and outputting the stepped-down power to the second power line 22 to which the low voltage-side terminals 43L and 44L are connected. Accordingly, a current flows from the first power line 21 side to the second power line 22 side.

The ECU 7 is a microcomputer and controls charging and discharging of the batteries B1 and B2 by operating the inverter 3, the voltage converter 4, the mechanical braking device 5, and the like during traveling and external charging of the batteries B1 and B2 using an external charger (not illustrated).

Figure 4:
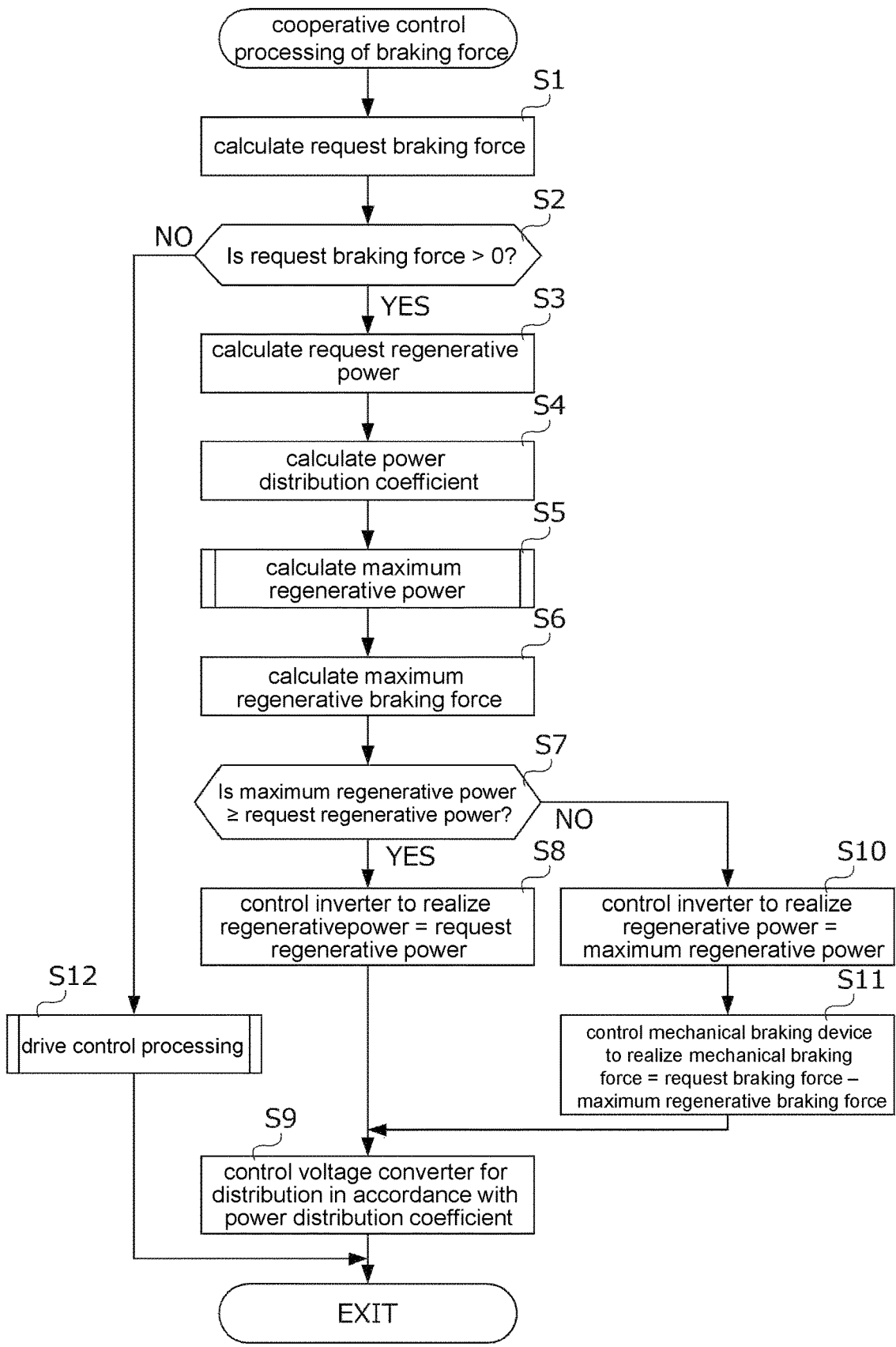
FIG. 4 is a flowchart showing a specific procedure of cooperative control processing of a mechanical braking force and a regenerative braking force.

FIG. 4 is a flowchart showing a specific procedure of cooperative control processing of a mechanical braking force and a regenerative braking force. The processing shown in FIG. 4 is repetitively executed by the ECU 7 in a predetermined control cycle until a start switch (not illustrated) is turned off by a driver to stop the power supply system 1 after the start switch is turned on by the driver to start the power supply system 1.

First, in S1, the ECU 7 calculates a request braking force with respect to a braking force to be applied to the driving wheel W, and proceeds to S2. More specifically, the ECU 7 acquires the operation amount of an accelerator pedal and the operation amount a brake pedal (not illustrated) and calculates the request braking force with respect to the driving wheel W based on the operation amounts of these pedals.

In S2, the ECU 7 determines whether or not the calculated request braking force is greater than zero. When the determination result in S2 is YES, that is, during deceleration, the ECU 7 proceeds to S3, and in a case of NO, that is, during acceleration or constant speed traveling, the ECU proceeds to S12. In S12, the ECU 7 executes drive control processing, which will be described below with reference to FIG. 6, and ends the cooperative control processing in FIG. 4.

In S3, the ECU 7 calculates a request regenerative power that is a parameter indicating the magnitude of the request braking force, based on this request braking force calculated in S1, and proceeds to S4. This request regenerative power corresponds to a regenerative power of the drive motor M output from the inverter 3 to the first power line 21 when it is intended to achieve the request braking force calculated in S1 with only a regenerative braking force applied to the driving wheel W by the drive motor M.

In S4, the ECU 7 calculates the value of a power distribution coefficient, and proceeds to S5. This power distribution coefficient corresponds to the ratio of a power to be consumed to charge the first battery B1 to the regenerative power output from the inverter 3 to the first power line 21 during deceleration. That is, when the regenerative power output to the first power line 21 is Pt, the power distribution coefficient is Rp, a power supplied to the first battery B1 is P1, and a power supplied to the voltage converter 4 and the second power line 22 is P2, the power P1 supplied to the first battery B1 and the power P2 supplied to the voltage converter 4 and the second power line 22 are expressed by the following expressions (1) and (2), respectively.

$$P1=Rp \times Pt \qquad (1)$$

$$P2=(1-Rp) \times Pt \qquad (2)$$

In S4, for example, the ECU 7 calculates the value of the power distribution coefficient within a range of zero to 1 based on the charging rate of the first battery B1, the charging rate of the second battery B2, and the like. For example, when the charging rate of the first battery B1 is close to the upper limit of use, the ECU 7 sets the value of the power distribution coefficient to zero to inhibit charging of the first battery B1.

In S5, in accordance with the procedure which will be described below with reference to FIG. 5, the ECU 7 calculates the maximum regenerative power that is the upper limit for the regenerative power output from the inverter 3 to the first power line 21, and proceeds to S6.

In S6, based on the maximum regenerative power calculated in S5, the ECU 7 calculates the maximum regenerative braking force that is a parameter indicating the magnitude of this maximum regenerative power, and proceeds to S7. This maximum regenerative braking force corresponds to a regenerative braking force applied from the drive motor M to the driving wheel W when the inverter 3 is subjected to switching control such that the regenerative power output from the inverter 3 to the first power line 21 reaches the maximum regenerative power calculated in S5.

In S7, the ECU 7 determines whether or not the maximum regenerative power is equal to or greater than the request regenerative power. When the determination result in S7 is YES, that is, when the maximum regenerative power is equal to or greater than the request regenerative power and the request braking force can be achieved with only a regenerative braking force using the drive motor M without using the mechanical braking device 5, the ECU 7 proceeds to S8. In S7, the ECU 7 may determine whether or not the maximum regenerative braking force calculated in S6 based on the maximum regenerative power is equal to or greater than the request braking force calculated in S1.

In S8, the ECU 7 sets the request regenerative power as a target of the regenerative power to be output from the inverter 3 to the first power line 21, executes switching control of the inverter 3 such that this target is output, and proceeds to S9. Accordingly, a regenerative braking force corresponding to the request braking force is applied from the drive motor M to the driving wheel W.

In S9, the ECU 7 executes switching control of the voltage converter 4 such that a power in the first power line 21 is distributed to the first battery B1 side, the voltage converter 4, and the second power line 22 side at the ratio set in accordance with the power distribution coefficient calculated in S4, and ends the processing in FIG. 4. Accordingly, a power calculated by multiplying the regenerative power output from the inverter 3 to the first power line 21 by the power distribution coefficient is supplied to the first battery B1, and a power calculated by multiplying the regenerative power by (1-power distribution coefficient) is supplied to the voltage converter 4, and the second battery B2 and the vehicle auxiliary machine H which are connected to the second power line 22.

When the determination result in S7 is NO, that is, when the request regenerative power is greater than the maximum regenerative power, the ECU 7 proceeds to S10. In S10, the ECU 7 sets the maximum regenerative power as a target of the regenerative power to be output from the inverter 3 to the first power line 21, executes switching control of the inverter 3 such that this target is output, and proceeds to S11. Accordingly, a regenerative braking force corresponding to the maximum regenerative braking force is applied from the drive motor M to the driving wheel W. In addition, as a result, the inverter 3 is controlled such that the regenerative power output from the inverter 3 to the first power line 21 does not exceed the maximum regenerative power. In S11, the ECU 7 sets the difference obtained by subtracting the maximum regenerative braking force from the request braking force, as a target for the mechanical braking force of the mechanical braking device 5, and proceeds to S9. Accordingly, the mechanical braking device 5 applies a mechanical braking force corresponding to the calculated difference to the driving wheel W. According to the above, a braking force which is realized by adding a regenerative braking force applied from the drive motor M and a mechanical braking force applied from the mechanical braking device 5 to correspond to the request braking force is applied to the driving wheel W.

Figure 5:
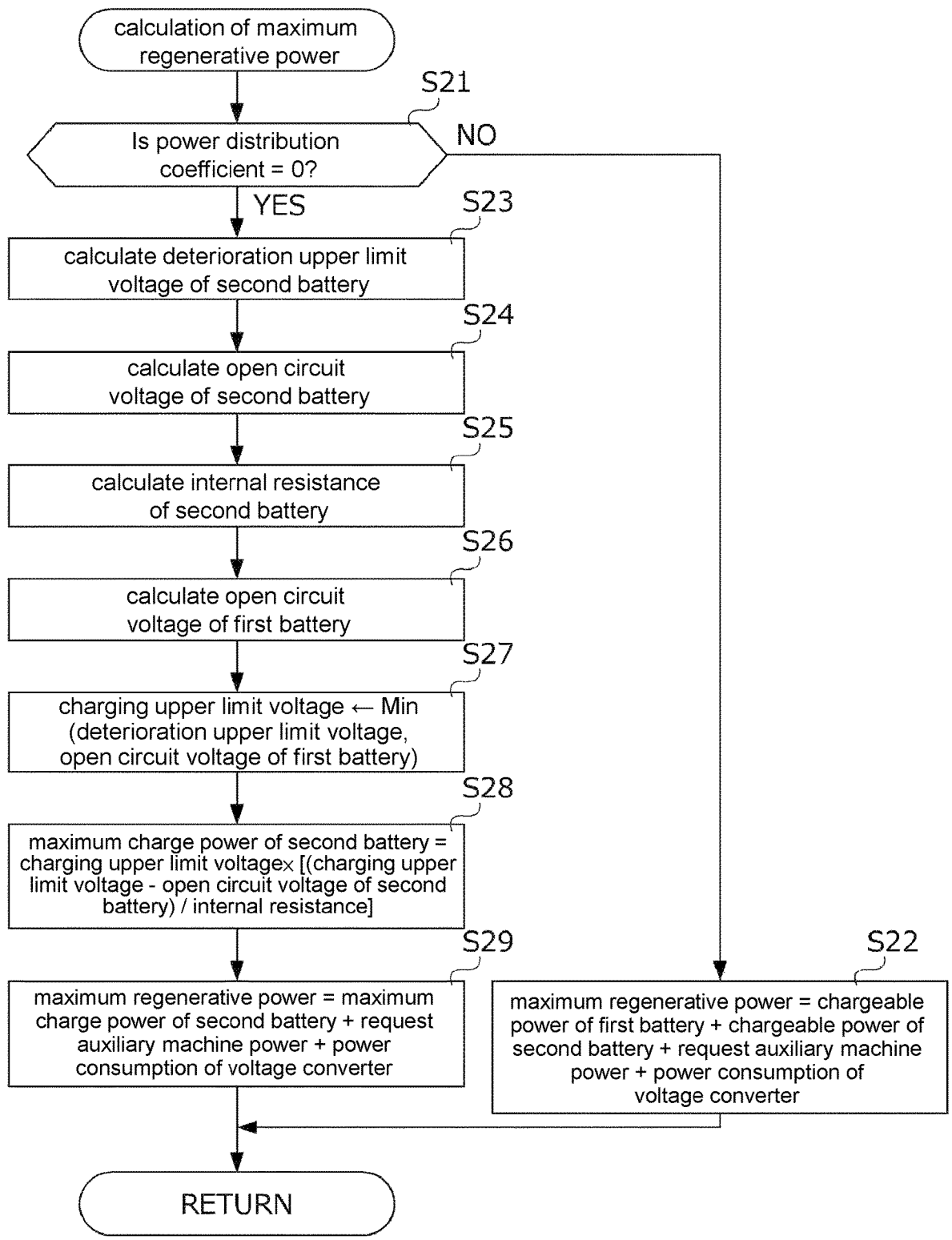
FIG. 5 is a flowchart showing a procedure of calculating a maximum regenerative power.

FIG. 5 is a flowchart showing a procedure of calculating the maximum regenerative power.

In S21, the ECU 7 determines whether or not the value of the power distribution coefficient is zero. When the determination result in S21 is NO, that is, when charging of the first battery B1 is not inhibited, the ECU 7 proceeds to S22. In S22, for example, the ECU 7 calculates the maximum regenerative power by adding a chargeable power of the first battery B1, a chargeable power of the second battery B2, a request auxiliary machine power in the vehicle auxiliary machine H, and a consumption power of the voltage converter 4 when the voltage converter 4 is driven.

When the determination result in S21 is YES, that is, when it is intended to inhibit charging of the first battery B1 (that is, when the second battery B2 serves as a charging target power storage device and the first battery B1 serves as a non-charging target power storage device), the ECU 7 proceeds to S23. In S23, the ECU 7 calculates the deterioration upper limit voltage of the second battery B2, and proceeds to S24. As described with reference to FIG. 2, the deterioration upper limit voltage is the upper limit voltage with respect to the range of use of the closed-circuit voltage of the second battery B2 during charging and is set such that deterioration of the second battery B2 is inhibited during charging. In S23, the ECU 7 calculates the deterioration upper limit voltage of the second battery B2 by searching for a map set in advance based on a parameter identifying the internal state of the second battery B2, such as the temperature or the charging rate of the second battery B2.

In S24, based on a signal transmitted from the second battery sensor unit 82, the ECU 7 calculates the open-circuit voltage of the second battery B2 utilizing a known algorithm, and proceeds to S25. In S25, the ECU 7 calculates the internal resistance of the second battery B2, and proceeds to S26. For example, the internal resistance of the second battery B2 is calculated by searching for a map set in advance based on the temperature of the second battery B2. In S26, the ECU 7 calculates the open-circuit voltage of the first battery B1 utilizing a known algorithm based on a signal transmitted from the first battery sensor unit 81, and proceeds to S27.

In S27, the ECU 7 calculates a charging upper limit voltage with respect to the closed-circuit voltage (that is, a voltage of the second power line 22) of the second battery B2 during charging, and proceeds to S28. More specifically, the ECU 7 sets the lower voltage of the deterioration upper limit voltage and the open-circuit voltage of the first battery B1 as the charging upper limit voltage.

As described with reference to FIG. 2, the range of use of the open-circuit voltage of the first battery B1 overlaps the closed-circuit voltage of the second battery B2. Therefore, there may be cases where the open-circuit voltage (refer to the bold one-dot chain line 2a in FIG. 2) of the first battery B1 becomes lower than the deterioration upper limit voltage (refer to the dotted line 2b in FIG. 2) of the second battery B2. In such a case, if as many regenerative powers as possible are collected as a priority using the second battery B2, the charging upper limit voltage provided in an embodiment is set to the deterioration upper limit voltage which is higher than the open-circuit voltage of the first battery B1. However, in this case, the voltage of the first power line 21 and the voltage of the second power line 22 are approximate to each other. Accordingly, when it is intended to raise the closed-circuit voltage of the second battery B2 to the deterioration upper limit voltage by driving the voltage converter 4, there is concern that a charging current will flow from the first power line 21 to the first battery B1 serving as the non-charging target power storage device so that the first battery B1 may deteriorate. Here, in the present embodiment, as described above, the regenerative power is restricted to prevent the foregoing problem by using the lower voltage of the deterioration upper limit voltage and the open-circuit voltage of the first battery B1 as the charging upper limit voltage.

In S28, the ECU 7 calculates the maximum charge power of the second battery B2, and proceeds to S29. More specifically, as expressed in the following expression (3), the ECU 7 calculates the maximum charge power using the charging upper limit voltage, the open-circuit voltage of the second battery B2, and the internal resistance of the second battery B2. As expressed in the following expression, when the voltage of the second power line 22 is used as the charging upper limit voltage and a charging current proportional to the difference between the charging upper limit voltage and the open-circuit voltage of the second battery B2 is supplied to the second battery B2 serving as the charging target power storage device, the maximum charge power corresponds to a power to be consumed in the second power line 22 to charge the second battery B2.

$$\text{Maximum charge power of second battery } B2 = \text{charging upper limit voltage} \times [(\text{charging upper limit voltage} - \text{open-circuit voltage of second battery } B2) \div \text{internal resistance}] \quad (3)$$

In S29, the ECU 7 calculates the maximum regenerative power by adding the maximum charge power of the second battery B2 calculated in S28, the request auxiliary machine power with respect to vehicle auxiliary machine H, and a consumption power of the voltage converter 4 when the voltage converter 4 is driven, and proceeds to S6 in FIG. 4.

As the above, in the processing in FIG. 5, the ECU 7 calculates the maximum regenerative power such that the closed-circuit voltage during charging the second battery B2 serving as the charging target power storage device becomes equal to or lower than the open-circuit voltage of the first battery B1 serving as the non-charging target power storage device. More specifically, when the deterioration upper limit voltage of the second battery B2 is lower than the open-circuit voltage of the first battery B1, the ECU 7 calculates the maximum regenerative power such that the closed-circuit voltage of the second battery B2 during charging becomes equal to the deterioration upper limit voltage. When the deterioration upper limit voltage of the second battery B2 is higher than the open-circuit voltage of the first battery B1, the ECU 7 calculates the maximum regenerative power such that the closed-circuit voltage of the second battery B2 during charging becomes equal to the open-circuit voltage of the first battery B1.

Figure 6:
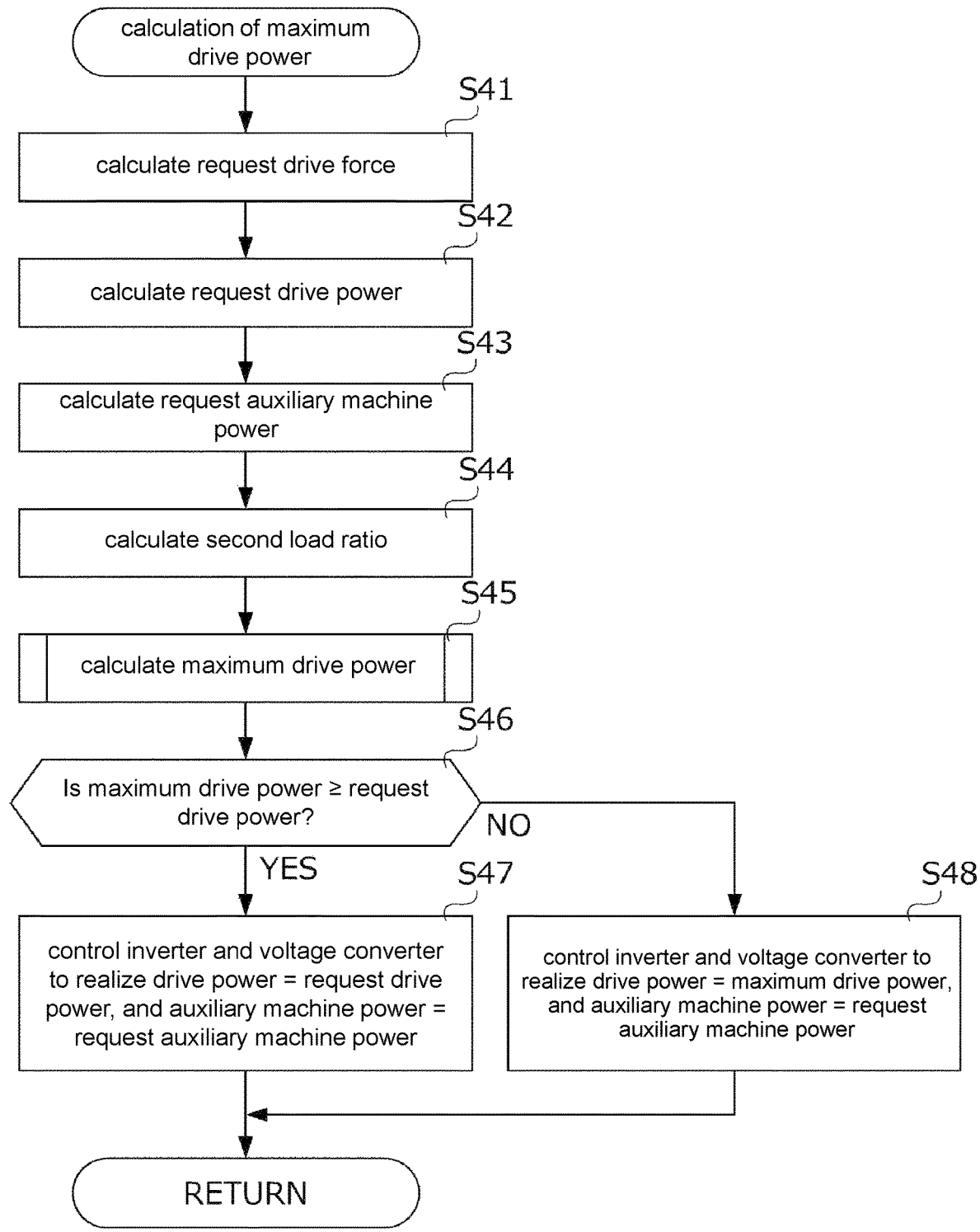
FIG. 6 is a flowchart showing a specific procedure of drive control processing.

FIG. 6 is a flowchart showing a specific procedure of drive control processing. The processing shown in FIG. 6 is executed when the request braking force is zero or lower, that is, during acceleration or constant speed traveling.

First, in S41, the ECU 7 calculates a request driving force respect to a vehicle driving force applied from the drive motor M to the driving wheel W, and proceeds to S42. More specifically, the ECU 7 acquires the operation amount of the accelerator pedal (not illustrated) and calculates the request driving force based on the operation amount of this accelerator pedal.

Next, in S42, the ECU 7 calculates a request driving power that is a parameter indicating the magnitude of the request driving force, based on this request driving force calculated in S41, and proceeds to S43. The request driving power corresponds to a power required to be supplied from the first power line 21 to the inverter 3 when it is intended to generate the request driving force calculated in S41 using the drive motor M.

In S43, the ECU 7 calculates the request auxiliary machine power that is a power requested in the vehicle auxiliary machine H, and proceeds to S44.

In S44, the ECU 7 calculates the value of a second load ratio, and proceeds to S45. This second load ratio corresponds to the ratio of a power discharged from the second battery B2 to the total discharge power discharged from the first battery B1 and the second battery B2 during acceleration or constant speed traveling. That is, the case where the second load ratio is zero corresponds to a state where discharging from the second battery B2 is inhibited. In S44, for example, the ECU 7 calculates the value of the second load ratio within a range of zero to 1 based on the charging rate of the first battery B1, the charging rate of the second battery B2, and the like. For example, when the charging rate of the second battery B2 is close to the lower limit of use or when the charging rate of the first battery B1 is close to the upper limit of use, the ECU 7 sets the value of the second load ratio to zero to inhibit discharging of the second battery B2.

In S45, in accordance with the procedure which will be described below with reference to FIG. 7, the ECU 7 calculates the maximum driving power that is the upper limit power with respect to a driving power supplied from the first power line 21 to the inverter 3, and proceeds to S46.

In S46, the ECU 7 determines whether or not the maximum driving power calculated in S45 is equal to or greater than the request driving power calculated in S42. When the determination result in S46 is YES, that is, when the maximum driving power is equal to or greater than the request driving power and a driving power corresponding to a request of a driver can be supplied to the inverter 3, the ECU 7 proceeds to S47.

In S47, the ECU 7 sets the request driving power calculated in S42 as a target of the driving power to be output from the first power line 21 to the inverter 3, sets the request auxiliary machine power calculated in S43 as a target of an auxiliary machine power to be output from the second power line 22 to the vehicle auxiliary machine H, executes switching control of the inverter 3 and the voltage converter 4 such that these targets are output, and ends the processing in FIG. 6. In S47, the ECU 7 executes switching control of the voltage converter 4 such that a power is discharged from the first battery B1 and the second battery B2 at the ratio set in accordance with the second load ratio calculated in S44. Accordingly, a power is discharged from the first battery B1 and the second battery B2 at the ratio set in accordance with the second load ratio. In addition, a power corresponding to a request is supplied to the drive motor M and the vehicle auxiliary machine H.

When the determination result in S46 is NO, that is, when the request driving power is greater than the maximum driving power and a power corresponding to a request cannot be supplied to the inverter 3, the ECU 7 proceeds to S48. In S48, the ECU 7 sets the maximum driving power calculated in S45 as a target of the driving power to be output from the first power line 21 to the inverter 3, sets the request auxiliary machine power calculated in S43 as a target of the auxiliary machine power to be output from the second power line 22 to the vehicle auxiliary machine H, executes switching control of the inverter 3 and the voltage converter 4 such that these targets are output, and ends the processing in FIG. 6. In S48, the ECU 7 executes switching control of the voltage converter 4 such that a power is discharged from the first battery B1 and the second battery B2 at the ratio set in accordance with the second load ratio calculated in S44.

Accordingly, a power is discharged from the first battery B1 and the second battery B2 at the ratio set in accordance with the second load ratio. The maximum driving power which is smaller than the request driving power is supplied to the drive motor M. The request auxiliary machine power is supplied to the vehicle auxiliary machine H.

Figure 7:
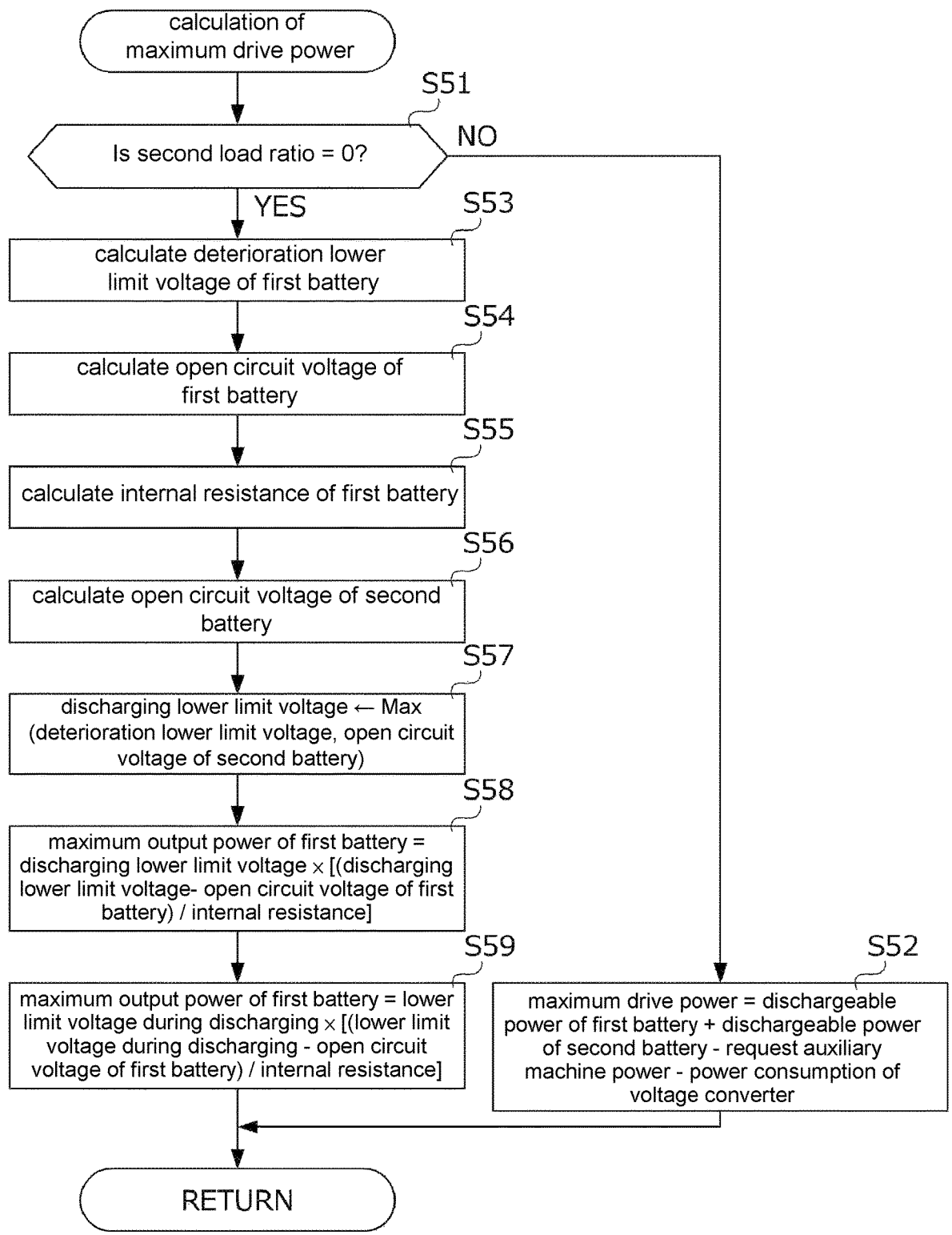
FIG. 7 is a flowchart showing a procedure of calculating a maximum driving power.

FIG. 7 is a flowchart showing a procedure of calculating the maximum driving power. In S51, the ECU 7 determines whether or not the value of the second load ratio is zero. When the determination result in S51 is NO, that is, when discharging of the second battery B2 is not inhibited, the ECU 7 proceeds to S52. In S52, for example, the ECU 7 calculates the maximum driving power by subtracting the request auxiliary machine power calculated in S43 and a consumption power of the voltage converter 4 when this voltage converter 4 is driven from the sum of a dischargeable power of the first battery B1 and a dischargeable power of the second battery B2.

When the determination result in S51 is YES, that is, when it is intended to inhibit discharging of the second battery B2 (that is, when the first battery B1 serves as the discharging target power storage device and the second battery B2 serves as the non-discharging target power storage device), the ECU 7 proceeds to S53. In S53, the ECU 7 calculates the deterioration lower limit voltage of the first battery B1, and proceeds to S54. As described with reference to FIG. 2, the deterioration lower limit voltage is the lower limit voltage with respect to the range of use of the closed-circuit voltage of the first battery B1 during discharging and is set such that deterioration of the first battery B1 is inhibited during discharging. In S53, the ECU 7 calculates the deterioration lower limit voltage of the first battery B1 by searching for a map set in advance based on a parameter identifying the internal state of the first battery B1, such as the temperature or the charging rate of the first battery B1.

In S54, based on a signal transmitted from the first battery sensor unit 81, the ECU 7 calculates the open-circuit voltage of the first battery B1 utilizing a known algorithm, and proceeds to S55. In S55, the ECU 7 calculates the internal resistance of the first battery B1, and proceeds to S56. For example, the internal resistance of this first battery B1 is calculated by searching for a map set in advance based on the temperature of the first battery B1. In S56, the ECU 7 calculates the open-circuit voltage of the second battery B2 utilizing a known algorithm based on a signal transmitted from the second battery sensor unit 82, and proceeds to S57.

In S57, the ECU 7 calculates a discharging lower limit voltage with respect to the closed-circuit voltage (that is, a voltage of the first power line 21) of the first battery B1 during discharging, and proceeds to S58. More specifically, the ECU 7 sets the higher voltage of the deterioration lower limit voltage and the open-circuit voltage of the second battery B2 as the discharging lower limit voltage.

As described with reference to FIG. 2, the range of use of the open-circuit voltage of the second battery B2 overlaps the closed-circuit voltage of the first battery B1. Therefore, there may be cases where the open-circuit voltage (refer to the bold one-dot chain line 2c in FIG. 2) of the second battery B2 becomes higher than the deterioration lower limit voltage (refer to the dotted line 2d in FIG. 2) of the first battery B1. In such a case, if as many powers as possible are discharged as a priority from the first battery B1, it may be that the discharging lower limit voltage is set to the deterioration lower limit voltage of the first battery B1 which is lower than the open-circuit voltage of the second battery B2. However, in this case, the voltage of the first power line 21 and the voltage of the second power line 22 are approximate to each other. Accordingly, there are cases where the second battery B2 is turned to discharging and a discharging current flows. Here, in the present embodiment, as described above, the driving power is restricted to prevent the foregoing problem by using the higher voltage of the deterioration lower limit voltage and the open-circuit voltage of the second battery B2 as the discharging-lower limit voltage.

In S58, the ECU 7 calculates the maximum output power of the first battery B1, and proceeds to S59. More specifically, as expressed in the following expression (4), the ECU 7 calculates the maximum output power of the first battery B1 using the discharging lower limit voltage, the open-circuit voltage of the first battery B1, and the internal resistance of the first battery B1. As expressed in the following expression, when the voltage of the first power line 21 is used as the discharging lower limit voltage and a discharging current proportional to the difference between the discharging lower limit voltage and the open-circuit voltage of the first battery B1 is supplied to the inverter 3, the maximum output power of the first battery B1 corresponds to a power to be consumed to drive the drive motor M.

Maximum output power of first battery
$B1$=discharging lower limit voltage×[(discharging lower limit voltage−open-circuit voltage of first battery $B1$)÷internal resistance]     (4)

In S59, the ECU 7 calculates the maximum driving power by subtracting the request auxiliary machine power calculated in S43 and a consumption power of the voltage converter 4 when this voltage converter 4 is driven from the maximum output power of the first battery B1 calculated in S58, and proceeds to S46 in FIG. 6.

As the above, in the processing in FIG. 7, the ECU 7 calculates the maximum driving power such that the closed-circuit voltage during discharging the first battery B1 serving as the discharging target power storage device becomes equal to or higher than the open-circuit voltage of the second battery B2 serving as the non-discharging target power storage device. More specifically, when the deterioration lower limit voltage of the first battery B1 is higher than the open-circuit voltage of the second battery B2, the ECU 7 calculates the maximum driving power such that the closed-circuit voltage of the first battery B1 during discharging becomes equal to the deterioration lower limit voltage. When the deterioration lower limit voltage of the first battery B1 is lower than the open-circuit voltage of the second battery B2, the ECU 7 calculates the maximum driving power such that the closed-circuit voltage of the first battery B1 during discharging becomes equal to the open-circuit voltage of the second battery B2.

In the vehicle V according to the present embodiment, when the first battery B1 serves as the non-charging target power storage device and the second battery B2 serves as the charging target power storage device, the following effects are exhibited.

(1) When the regenerative power output from the inverter 3 to the first power line 21 during deceleration of the vehicle is supplied to the second battery B2 serving as the charging target power storage device and this second battery B2 is charged, the ECU 7 calculates the maximum regenerative power that is the upper limit power with respect to the regenerative power based on the open-circuit voltage of the first battery B1 serving as the non-charging target power storage device and controls the inverter 3 and the voltage converter 4 such that the regenerative power does not exceed this maximum regenerative power. Accordingly, in the vehicle V, when the vehicle decelerates, the second battery B2 can be charged using the regenerative power generated by the drive motor M, while an unintended charging current is inhibited from flowing to the first battery B1.

(2) The ECU 7 calculates the maximum regenerative power such that the closed-circuit voltage of the second battery B2 during charging becomes equal to or lower than the open-circuit voltage of the first battery B1. Accordingly, in the vehicle V, when the vehicle decelerates, the second battery B2 can be charged using the regenerative power generated by the drive motor M, while an unintended charging current is inhibited from flowing to the first battery B1.

(3) The ECU 7 calculates the maximum regenerative power such that the closed-circuit voltage of the second battery B2 during charging becomes equivalent to the open-circuit voltage of the first battery B1. Accordingly, in the vehicle V, as many regenerative powers as possible can be generated during deceleration and the second battery B2 can be charged using this regenerative power, while an unintended charging current is inhibited from flowing to the first battery B1.

(4) The ECU 7 calculates the deterioration upper limit voltage that is an upper limit voltage with respect to the closed-circuit voltage of the second battery B2 during charging such that the second battery B2 does not deteriorate. In addition, the ECU 7 defines the lower voltage of the deterioration upper limit voltage and the open-circuit voltage of the first battery B1 as the charging upper limit voltage. In addition, when the closed-circuit voltage of the second battery B2 during charging is used as the charging upper limit voltage and a charging current corresponding to the difference between the charging upper limit voltage and the open-circuit voltage of the second battery B2 is supplied to the second battery B2, the ECU 7 sets a power to be consumed to charge the second battery B2 to the maximum charge power and calculates the maximum regenerative power based on this maximum charge power. Accordingly, in the vehicle V, as many regenerative powers as possible can be generated during deceleration and the second battery B2 can be charged using this regenerative power, while an unintended charging current is inhibited from flowing to the first battery B1. In addition, since the second closed-circuit voltage during charging the second battery B2 is equal to or lower than the deterioration upper limit voltage, the second power storage device can also be inhibited from deteriorating due to charging.

(5) In the vehicle V, when a request braking force with respect to the braking force to be applied to the driving wheel W is acquired and the request regenerative power indicating the magnitude of the request braking force is greater than the maximum regenerative power, the mechanical braking device 5 is controlled such that the mechanical braking force of the mechanical braking device 5 reaches the magnitude corresponding to the difference between the request regenerative power and the maximum regenerative power, more specifically, the difference between the request braking force, which is obtained by converting the dimensions thereof, and the maximum regenerative braking force. Accordingly, the mechanical braking device 5 can be controlled such that a braking force corresponding to a request is applied to the driving wheel W, while the second battery B2 is charged using as many regenerative powers as possible during deceleration.

In the vehicle V according to the present embodiment, when the first battery B1 serves as the discharging target power storage device and the second battery B2 serves as the non-discharging target power storage device, the following effects are exhibited.

(6) When the drive motor M is driven using a power output from the first battery B1 serving as the discharging target power storage device while discharging from the second battery B2 serving as the non-discharging target power storage device is inhibited, the ECU 7 calculates the maximum driving power that is the upper limit power with respect to the driving power output from the first power line 21 to the inverter 3 based on the open-circuit voltage of the second battery B2 and controls the inverter 3 and the voltage converter 4 such that the driving power does not exceed this maximum driving power. Accordingly, in the vehicle V, during acceleration or constant speed traveling, the drive motor M can be driven using a power discharged from the first battery B1, while an unintended discharging current is inhibited from flowing from the second battery B2.

(7) The ECU 7 calculates the maximum driving power such that the closed-circuit voltage of the first battery B1 during discharging becomes equal to or higher than the open-circuit voltage of the second battery B2. Accordingly, in the vehicle V, during acceleration or constant speed traveling, the drive motor M can be driven using a power discharged from the first battery B1, while an unintended discharging current is inhibited from flowing from the second battery B2.

(8) The ECU 7 calculates the maximum driving power such that the closed-circuit voltage of the first battery B1 during discharging becomes equal to the open-circuit voltage of the second battery B2. Accordingly, in the vehicle V, as many powers as possible can be supplied to the inverter 3 during acceleration or constant speed traveling and the drive motor M can be driven, while an unintended discharging current is inhibited from flowing from the second battery B2.

(9) The ECU 7 calculates the deterioration lower limit voltage that is a lower limit voltage with respect to the closed-circuit voltage of the first battery B1 during discharging such that the first battery B1 does not deteriorate. In addition, the ECU 7 defines the higher voltage of the deterioration lower limit voltage and the open-circuit voltage of the second battery B2 as the discharging lower limit voltage. When the closed-circuit voltage of the first battery B1 is used as this discharging lower limit voltage and a discharging current corresponding to the difference between the discharging lower limit voltage and the open-circuit voltage of the first battery B1 is supplied to the inverter 3, the ECU 7 calculates a power (maximum output power of the first battery B1) to be consumed to drive the drive motor M and calculates the maximum driving power based on this maximum output power. Accordingly, in the vehicle V, as many powers as possible can be supplied to the inverter 3 during acceleration or constant speed traveling and the drive motor M can be driven using this power, while an unintended discharging current is inhibited from flowing from the second battery B2. In addition, since the closed-circuit voltage of the first battery B1 during discharging the first battery B1 is equal to or higher than the deterioration lower limit voltage, the first battery B1 can also be inhibited from deteriorating due to discharging.

Hereinabove, the first embodiment of the present disclosure has been described. However, the present disclosure is not limited thereto. Detailed constitution may be suitably changed within a range of the gist of the present disclosure.

For example, in the foregoing embodiment, the lower voltage of the deterioration upper limit voltage and the open-circuit voltage of the first battery B1 is used as the charging upper limit voltage (refer to S27 in FIG. 5), and the maximum charge power of the second battery B2 is calculated based on this charging upper limit voltage (refer to S28). However, the present disclosure is not limited thereto. According to the present embodiment, for example, when the deterioration upper limit voltage is higher than the open-circuit voltage of the first battery B1, the charging upper limit voltage and the open-circuit voltage of the first battery B1 become equivalent to each other. Therefore, the maximum charge power of the second battery B2 is set such that the closed-circuit voltage of the second battery B2 during of charging becomes equal to the open-circuit voltage of the first battery B1.

Here, for example, the maximum charge power of the second battery B2 may be set such that the closed-circuit voltage of the second battery B2 during charging becomes lower than the open-circuit voltage of the first battery B1 at all times. This can be realized in the processing in S27 by setting a predetermined margin voltage as the open-circuit voltage of the first battery B1. That is, in S27, the lower voltage of the deterioration upper limit voltage and a voltage obtained by subtracting a positive margin voltage from the open-circuit voltage of the first battery B1 is used as the charging upper limit voltage. Accordingly, the charging upper limit voltage can be lower than the open-circuit voltage of the first battery B1 at all times.

Second Embodiment

Hereinafter, a vehicle according to a second embodiment of the present disclosure will be described with reference to the drawings.

Figure 8:
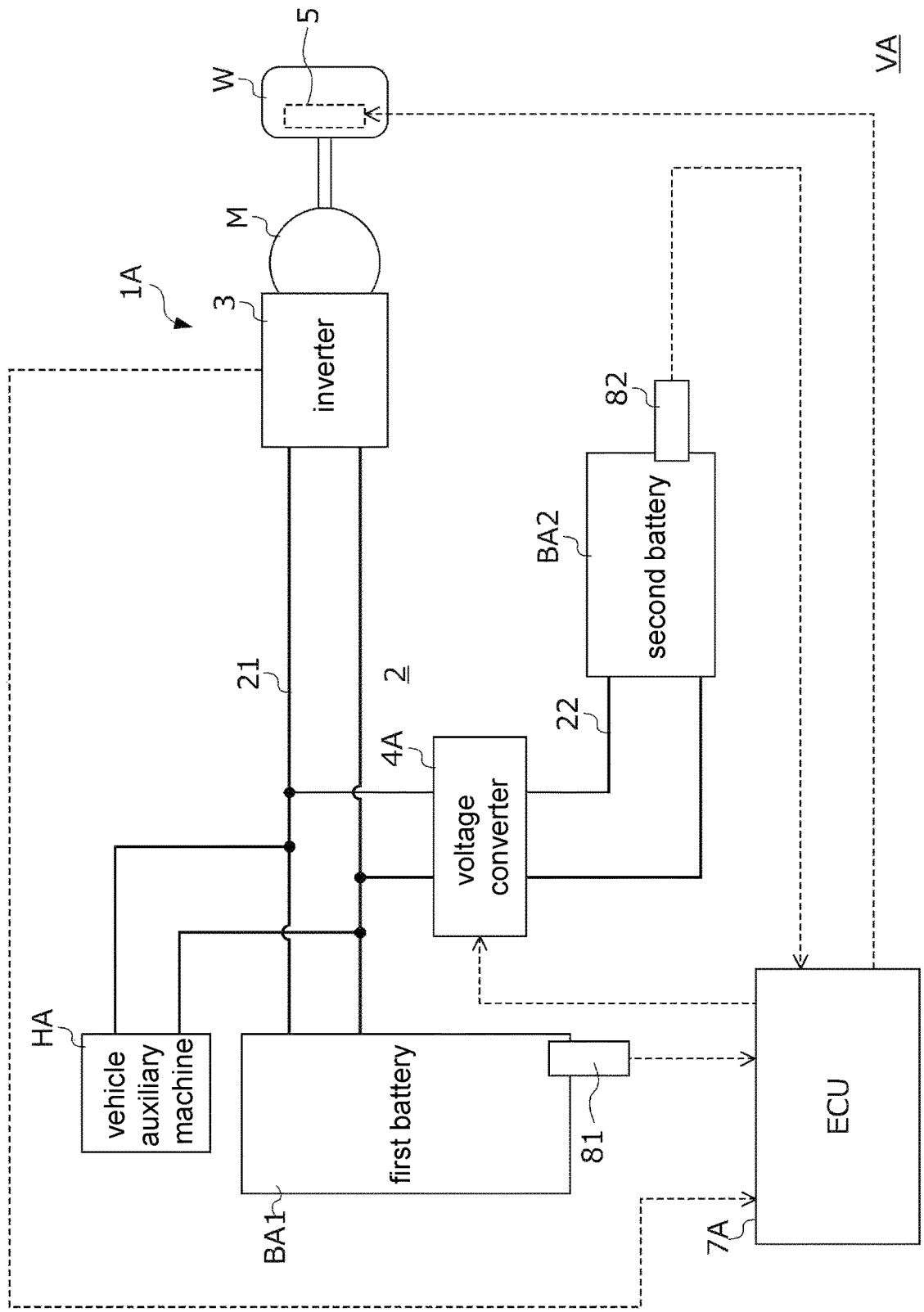
FIG. 8 is a view illustrating a configuration of an electrically driven vehicle according to a second embodiment of the present disclosure.

FIG. 8 is a view illustrating a configuration of a vehicle VA according to the present embodiment. The vehicle VA according to the present embodiment differs from the vehicle V according to the first embodiment in a configuration of a power supply system 1A. More specifically, the vehicle VA differs in configurations of a connection position of a vehicle auxiliary machine HA, ranges of use of a first battery BA1 and a second battery BA2, a voltage converter 4A, and an ECU 7A. In the following description of the present embodiment, the same reference signs are applied to the same constitutions as the first embodiment and detailed description thereof will be omitted. Points different from the first embodiment will be described. In the present embodiment, the vehicle auxiliary machine HA is connected to the first power line 21 between the second power line 22 and the first battery BA1.

Figure 9:
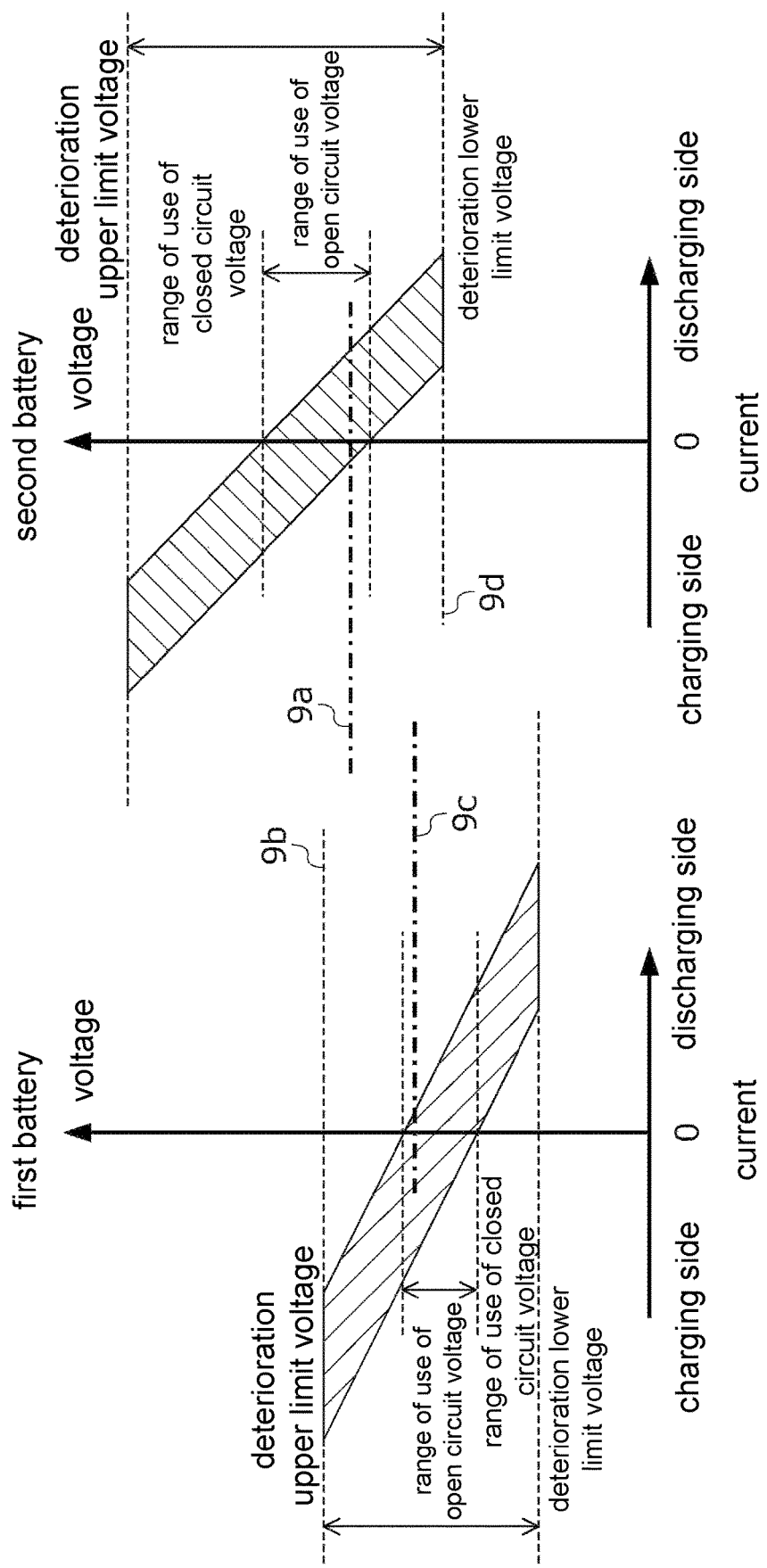
FIG. 9 is a view comparing ranges of use of a voltage of a first battery and a second battery in a power supply system.

FIG. 9 is a view comparing ranges of use of a voltage of the first battery BA1 and the second battery BA2 in the power supply system 1A. In FIG. 9, the left side is a view illustrating the range of use of a voltage of the first battery BA1, and the right side is a view illustrating the range of use of a voltage of the second battery BA2. In FIG. 9, the horizontal axis indicates a current flowing in the battery, and the vertical axis indicates a voltage of the battery.

As illustrated in FIG. 9, the range of use with respect to the open-circuit voltage of the first battery BA1 does not overlap the range of use with respect to the open-circuit voltage of the second battery BA2, and the range of use with respect to the closed-circuit voltage of the first battery BA1 overlaps the range of use with respect to the closed-circuit voltage of the second battery BA2. More specifically, the range of use with respect to the closed-circuit voltage of the first battery BA1 overlaps the range of use with respect to the open-circuit voltage of the second battery BA2. In addition, in the present embodiment, a case where the range of use with respect to the open-circuit voltage of the second battery BA2 is higher than the range of use with respect to the open-circuit voltage of the first battery BA1 will be described.

Figure 10:
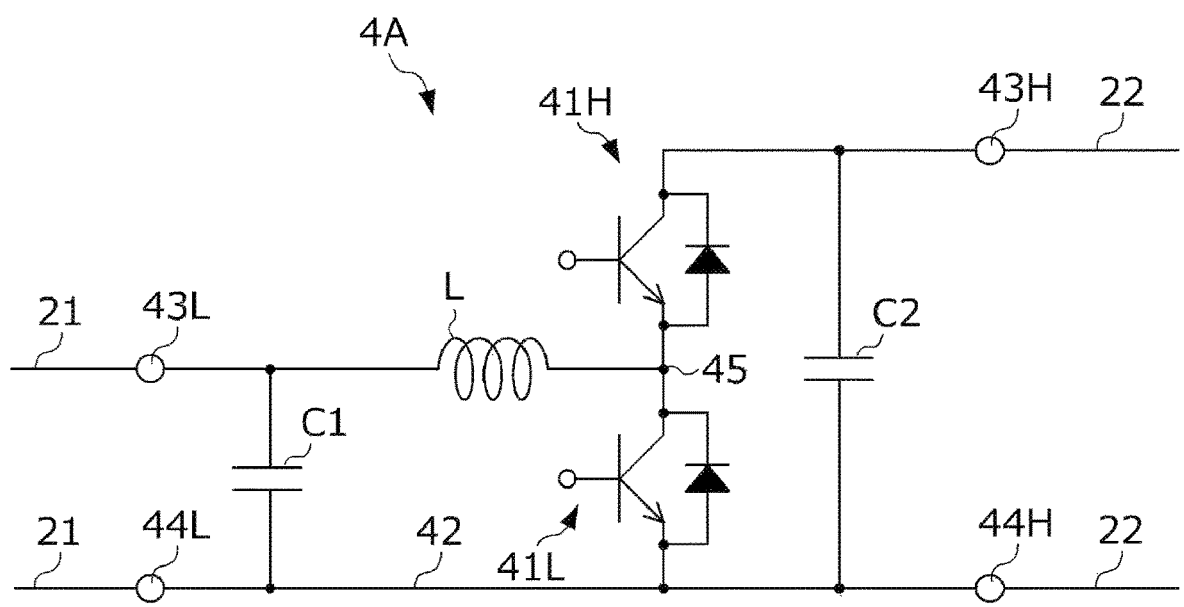
FIG. 10 is a view illustrating a circuit configuration of a voltage converter.

FIG. 10 is a view illustrating a circuit configuration of the voltage converter 4A.

The voltage converter 4A connects the first power line 21 to which the first battery BA1 is connected and the second power line 22 to which the second battery BA2 is connected and converts a voltage between the first power line 21 and the second power line 22. As described with reference to FIG. 9, in the present embodiment, the range of use with respect to the open-circuit voltage of the second battery BA2 is higher than the range of use with respect to the open-circuit voltage of the first battery BA1 and does not overlap the same. Therefore, basically, the voltage of the second power line 22 is higher than the voltage of the first power line 21. Here, in the present embodiment, the low voltage-side terminals 43L and 44L of the voltage converter 4A are connected to the first power line 21, and the high voltage-side terminals 43H and 44H are connected to the second power line 22.

In addition, when the drive motor is driven using both a power discharged from the first battery BA1 and a power discharged from the second battery BA2, the ECU 7A drives the voltage converter 4A to exhibit a step-down function. The step-down function denotes a function of stepping down a power in the second power line 22 to which the high voltage-side terminals 43H and 44H are connected and outputting the stepped-down power to the first power line 21 to which the low voltage-side terminals 43L and 44L are connected. Accordingly, a current flows from the second power line 22 side to the first power line 21 side.

In addition, when the first battery BA1 or the second battery BA2 is charged using a regenerative power output from the drive motor to the first power line 21 during deceleration, the ECU 7A causes the voltage converter 4A to exhibit a step-up function. The step-up function denotes a function of stepping up a power in the first power line 21 to which the low voltage-side terminals 43L and 44L are connected and outputting the stepped-up power to the second power line 22 to which the high voltage-side terminals 43H and 44H are connected. Accordingly, a current flows from the first power line 21 side to the second power line 22 side. In addition, when charging of the second battery BA2 is inhibited and only the first battery BA1 is charged using the regenerative power output from the drive motor to the first power line 21, the ECU 7A turns off the voltage converter 4A such that no current flows from the first power line 21 to the second power line 22. However, in this case, when the voltage of the first power line 21 becomes higher than the voltage of the second power line 22, there are cases where a current flows from the first power line 21 to the second power line 22 and the second battery BA2 is charged via the free-wheeling diode of the high arm element 41H.

Figure 11:
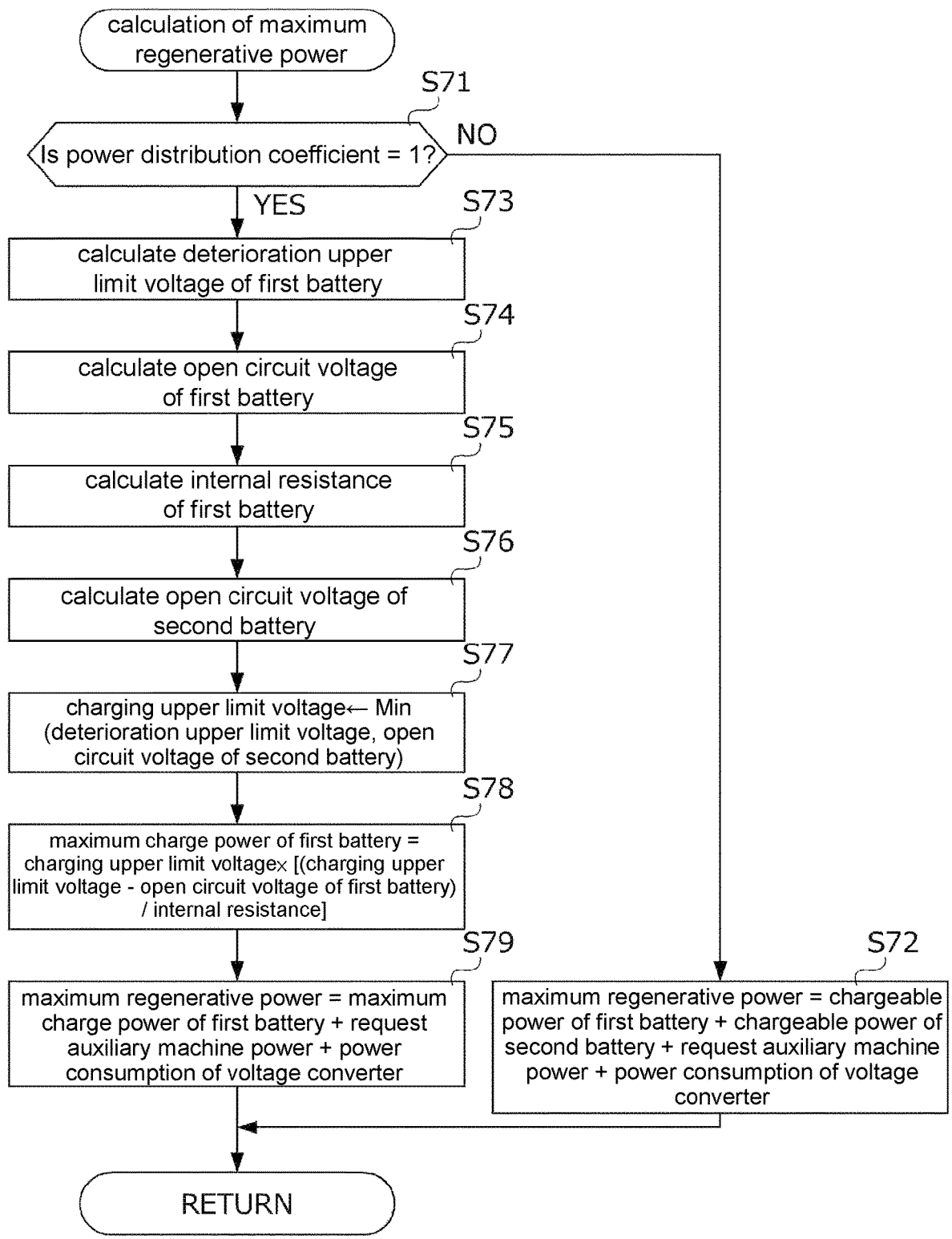
FIG. 11 is a flowchart showing a procedure of calculating the maximum regenerative power.

FIG. 11 is a flowchart showing a procedure of calculating the maximum regenerative power.

In S71, the ECU 7A determines whether or not the value of the power distribution coefficient is 1. When the determination result in S71 is NO, that is, when charging of the second battery BA2 is not inhibited, the ECU 7A proceeds to S72. In S72, for example, the ECU 7A calculates the maximum regenerative power by adding a chargeable power of the first battery BA1, a chargeable power of the second battery BA2, a request auxiliary machine power in the vehicle auxiliary machine HA, and a consumption power of the voltage converter 4A when this voltage converter 4A is driven.

When the determination result in S71 is YES, that is, when it is intended to inhibit charging of the second battery BA2 (that is, when the first battery BA1 serves as a charging target power storage device and the second battery BA2 serves as a non-charging target power storage device), the ECU 7A proceeds to S73. In S73, the ECU 7A calculates the deterioration upper limit voltage of the first battery BA1 such that deterioration of the first battery BA1 is inhibited, by searching for a map set in advance based on a parameter identifying the internal state of first battery BA1, such as the temperature or the charging rate of the first battery BA1, and proceeds to S74.

In S74, based on a signal transmitted from the first battery sensor unit, the ECU 7A calculates the open-circuit voltage of the first battery BA1 utilizing a known algorithm, and proceeds to S75. In S75, the ECU 7A calculates the internal resistance of the first battery BA1, and proceeds to S76. For example, the internal resistance of this first battery BA1 is calculated by searching for a map set in advance based on the temperature of the first battery BA1. In S76, the ECU 7A calculates the open-circuit voltage of the second battery BA2 utilizing a known algorithm based on a signal transmitted from the second battery sensor unit, and proceeds to S77.

In S77, the ECU 7A calculates a charging upper limit voltage with respect to the closed-circuit voltage (that is, a voltage of the first power line) of the first battery BA1 during charging, and proceeds to S78. More specifically, the ECU 7A sets the lower voltage of the deterioration upper limit voltage and the open-circuit voltage of the second battery BA2 as the charging upper limit voltage.

As described with reference to FIG. 9, the range of use of the open-circuit voltage of the second battery BA2 overlaps the closed-circuit voltage of the first battery BA1. Therefore, there may be cases where the open-circuit voltage (refer to the bold one-dot chain line 9a in FIG. 9) of the second battery BA2 becomes lower than the deterioration upper limit voltage (refer to the dotted line 9b in FIG. 9) of the first battery BA1. In such a case, if as many regenerative powers as possible are collected as a priority using the first battery BA1, it may be that the charging upper limit voltage is set to the deterioration upper limit voltage which is higher than the open-circuit voltage of the second battery BA2. However, in this case, the voltage of the first power line and the voltage of the second power line are approximate to each other. Accordingly, when it is intended to raise the closed-circuit voltage of the first battery BA1 to the deterioration upper limit voltage by driving the voltage converter 4A, there is concern that a charging current will flow from the second power line to the second battery BA2 serving as the non-charging target power storage device so that the second battery BA2 may deteriorate. Here, in the present embodiment, as described above, the regenerative power is restricted to prevent the foregoing problem by using the lower voltage of the deterioration upper limit voltage and the open-circuit voltage of the second battery BA2 as the charging upper limit voltage.

In S78, the ECU 7A calculates the maximum charge power of the first battery BA1, and proceeds to S79. More specifically, as expressed in the following expression (5), the ECU 7A calculates the maximum charge power using the charging upper limit voltage, the open-circuit voltage of the first battery BA1, and the internal resistance of the first battery BA1. As expressed in the following expression, when the voltage of the first power line is used as the charging upper limit voltage and a charging current proportional to the difference between the charging upper limit voltage and the open-circuit voltage of the first battery BA1 is supplied to the first battery BA1 serving as the charging target power storage device, the maximum charge power corresponds to a power to be consumed in the first power line to charge the first battery BA1.

Maximum charge power of first battery
$BA1$=charging upper limit voltage×[(charging upper limit voltage−open-circuit voltage of first battery $BA1$)÷internal resistance]     (5)

In S79, the ECU 7A calculates the maximum regenerative power by adding the maximum charge power of the first battery BA1 calculated in S78, the request auxiliary machine power with respect to the vehicle auxiliary machine HA, and a consumption power of the voltage converter 4A when this voltage converter 4A is driven, and proceeds to S6 in FIG. 4.

As the above, in the processing in FIG. 11, the ECU 7A calculates the maximum regenerative power such that the closed-circuit voltage during charging the first battery BA1 serving as the charging target power storage device becomes equal to or lower than the open-circuit voltage of the second battery BA2 serving as the non-charging target power storage device. More specifically, when the deterioration upper limit voltage of the first battery BA1 is lower than the open-circuit voltage of the second battery BA2, the ECU 7A calculates the maximum regenerative power such that the closed-circuit voltage of the first battery BA1 during charging becomes equal to the deterioration upper limit voltage. When the deterioration upper limit voltage of the first battery BA1 is higher than the open-circuit voltage of the second battery BA2, the ECU 7A calculates the maximum regenerative power such that the closed-circuit voltage of the first battery BA1 during charging becomes equal to the open-circuit voltage of the second battery BA2.

Figure 12:
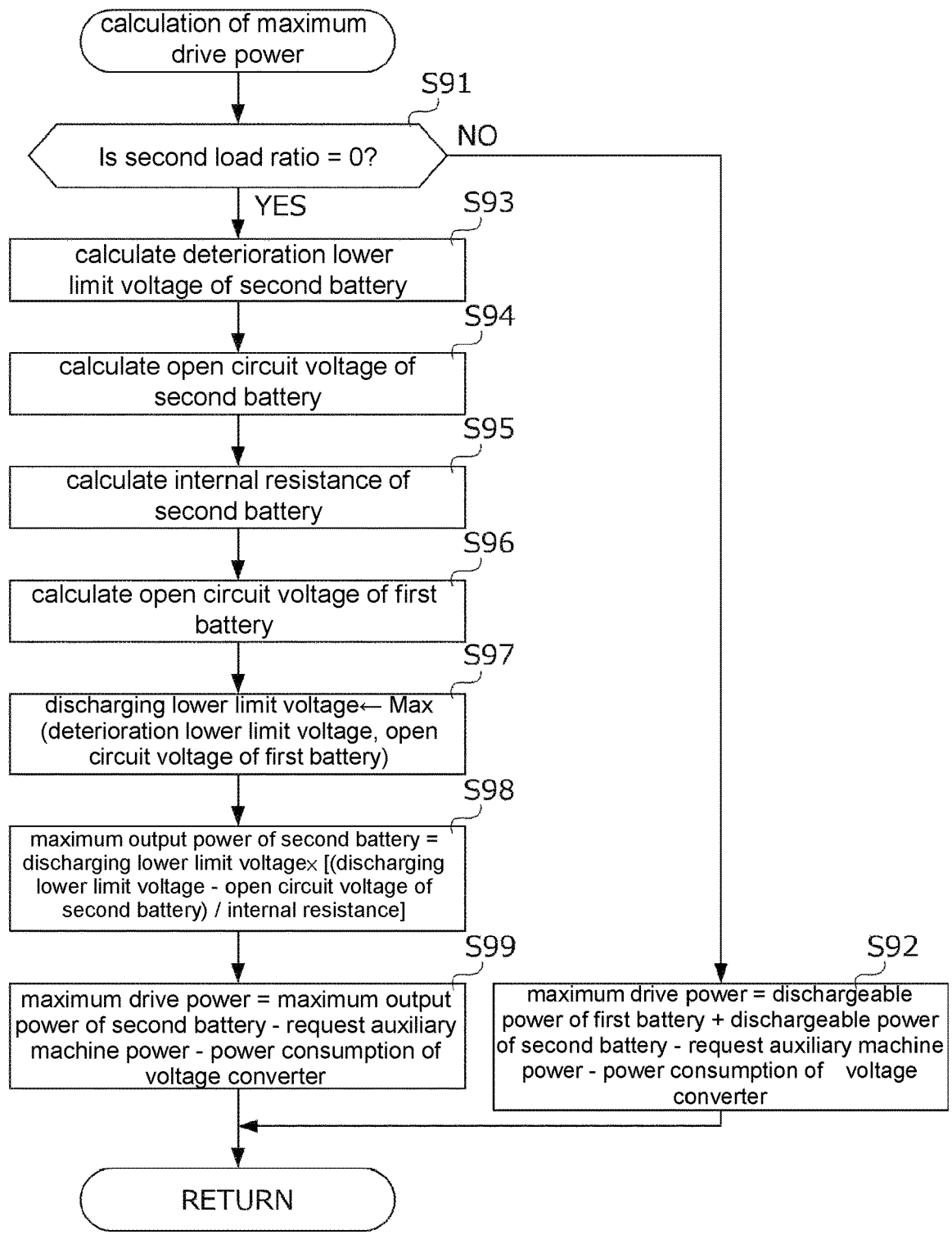
FIG. 12 is a flowchart showing a procedure of calculating the maximum driving power.

FIG. 12 is a flowchart showing a procedure of calculating the maximum driving power.

In S91, the ECU 7A determines whether or not the value of the second load ratio is 1. When the determination result in S91 is NO, that is, when discharging of the first battery BA1 is not inhibited, the ECU 7A proceeds to S92. In S92, for example, the ECU 7A calculates the maximum driving power by subtracting the request auxiliary machine power calculated in S93 and a consumption power t of the voltage converter 4A when this voltage converter 4A is driven from the sum of a dischargeable power of the first battery BA1 and a dischargeable power of the second battery BA2.

When the determination result in S91 is YES, that is, when it is intended to inhibit discharging of the first battery BA1 (that is, when the second battery BA2 serves as the discharging target power storage device and the first battery BA1 serves as the non-discharging target power storage device), the ECU 7A proceeds to S93. In S93, the ECU 7A calculates the deterioration lower limit voltage of the second battery BA2 by searching for a map set in advance based on a parameter identifying the internal state of the second battery BA2, such as the temperature or the charging rate of the second battery BA2, and proceeds to S94.

In S94, based on a signal transmitted from the second battery sensor unit, the ECU 7A calculates the open-circuit voltage of the second battery BA2 utilizing a known algorithm, and proceeds to S95. In S95, the ECU 7A calculates the internal resistance of the second battery BA2, and proceeds to S96. For example, the internal resistance of this second battery BA2 is calculated by searching for a map set in advance based on the temperature of the second battery BA2. In S96, the ECU 7A calculates the open-circuit voltage of the first battery BA1 utilizing a known algorithm based on a signal transmitted from the first battery sensor unit, and proceeds to S97.

In S97, the ECU 7A calculates a discharging lower limit voltage with respect to the closed-circuit voltage (that is, a voltage of the second power line) of the second battery BA2 during discharging, and proceeds to S98. More specifically, the ECU 7A sets the higher voltage of the deterioration lower limit voltage and the open-circuit voltage of the first battery BA1 as the discharging lower limit voltage.

As described with reference to FIG. 9, the range of use of the open-circuit voltage of the first battery BA1 overlaps the closed-circuit voltage of the second battery BA2. Therefore, there may be cases where the open-circuit voltage (refer to the bold one-dot chain line 9c in FIG. 9) of the first battery BA1 becomes higher than the deterioration lower limit voltage (refer to the dotted line 9d in FIG. 9) of the second battery BA2. In such a case, if as many powers as possible are discharged as a priority from the second battery BA2, the discharging lower limit voltage provided in an embodiment is set to the deterioration lower limit voltage of the second battery BA2 which is lower than the open-circuit voltage of the first battery BA1. However, in this case, the voltage of the first power line and the voltage of the second power line are approximate to each other. Accordingly, there are cases where the first battery BA1 is turned to discharging and a discharging current flows. Here, in the present embodiment, as described above, the driving power is restricted to prevent the foregoing problem by using the higher voltage of the deterioration lower limit voltage and the open-circuit voltage of the first battery BA1 as the discharging lower limit voltage.

In S98, the ECU 7A calculates the maximum output power of the second battery BA2, and proceeds to S99. More specifically, as expressed in the following expression (6), the ECU 7A calculates the maximum output power of the second battery BA2 using the discharging lower limit voltage, the open-circuit voltage of the second battery BA2, and the internal resistance of the second battery BA2. As expressed in the following expression, when the voltage of the second power line is used as the discharging lower limit voltage and a discharging current proportional to the difference between the discharging lower limit voltage and the open-circuit voltage of the second battery BA2 is supplied to the inverter, the maximum output power of the second battery BA2 corresponds to a power to be consumed to drive the drive motor.

$$\text{Maximum output power of second battery } BA2 = \text{discharging lower limit voltage} \times [(\text{discharging lower limit voltage} - \text{open-circuit voltage of second battery } BA2) \div \text{internal resistance}] \quad (6)$$

In S99, the ECU 7A calculates the maximum driving power by subtracting the request auxiliary machine power calculated in S43 and a consumption power of the voltage converter 4A when this voltage converter 4A is driven from the maximum output power of the second battery BA2 calculated in S98, and proceeds to S46 in FIG. 6.

As the above, in the processing in FIG. 12, the ECU 7A calculates the maximum driving power such that the closed-circuit voltage during discharging the second battery BA2 serving as the discharging target power storage device becomes equal to or higher than the open-circuit voltage of the first battery BA1 serving as the non-discharging target power storage device. More specifically, when the deterioration lower limit voltage of the second battery BA2 is higher than the open-circuit voltage of the first battery BA1, the ECU 7A calculates the maximum driving power such that the closed-circuit voltage of the second battery BA2 during discharging becomes equal to the deterioration lower limit voltage. When the deterioration lower limit voltage of the second battery BA2 is lower than the open-circuit voltage of the first battery BA1, the ECU 7A calculates the maximum driving power such that the closed-circuit voltage of the second battery BA2 during discharging becomes equal to the open-circuit voltage of the first battery BA1.

In the vehicle VA according to the present embodiment, when the first battery BA1 serves as the charging target power storage device and the second battery BA2 serves as the non-charging target power storage device, the following effects are exhibited.

(10) The ECU 7A calculates the deterioration upper limit voltage that is an upper limit voltage with respect to the closed-circuit voltage of the first battery BA1 during charging such that the first battery BA1 does not deteriorate. In addition, the ECU 7A defines the lower voltage of the deterioration upper limit voltage and the open-circuit voltage of the second battery BA2 as the charging upper limit voltage. When the closed-circuit voltage of the first battery BA1 is used as the charging upper limit voltage and a charging current proportional to the difference between the charging upper limit voltage and the open-circuit voltage of the first battery BA1 is supplied to the first battery BA1, the ECU 7A sets a power to be consumed to charge the first battery BA1 to the maximum charge power and calculates the upper limit power based on this maximum charge power. Accordingly, in the vehicle VA, as many regenerative powers as possible can be generated during deceleration and the first battery BA1 can be charged using this regenerative power, while an unintended charging current is inhibited from flowing to the second battery BA2. In addition, since the closed-circuit voltage of the first battery BA1 during charging the first battery BA1 is equal to or lower than the deterioration upper limit voltage, the first battery BA1 can also be inhibited from deteriorating due to charging.

In the vehicle VA according to the present embodiment, when the second battery BA2 serves as the discharging target power storage device and the first battery BA1 serves as the non-discharging target power storage device, the following effects are exhibited.

(11) The ECU 7A calculates the deterioration lower limit voltage that is a lower limit voltage with respect to the closed-circuit voltage of the second battery BA2 during discharging such that the second battery BA2 does not deteriorate. In addition, the ECU 7A defines the higher voltage of the deterioration lower limit voltage and the open-circuit voltage of the first battery BA1 as the discharging lower limit voltage. When the closed-circuit voltage of the second battery BA2 is used as the discharging lower limit voltage and a discharging current corresponding to the difference between the discharging lower limit voltage and the open-circuit voltage of the second battery BA2 is supplied to the inverter, the ECU 7A sets a power to be consumed to drive the drive motor M to the maximum output power and calculates the maximum driving power based on this maximum output power. Accordingly, in the vehicle VA, as many powers as possible can be supplied to the inverter during acceleration or constant speed traveling and the drive motor M can be driven using this power, while an unintended discharging current is inhibited from flowing from the first battery BA1. In addition, since the closed-circuit voltage of the second battery BA2 during discharging the second battery BA2 is equal to or higher than the deterioration lower limit voltage, the second battery BA2 can also be inhibited from deteriorating due to discharging.

Hereinabove, the second embodiment of the present disclosure has been described. However, the present disclosure is not limited thereto. Detailed constitution may be suitably changed within a range of the gist of the present disclosure.

For example, in the foregoing embodiment, the lower voltage of the deterioration upper limit voltage and the open-circuit voltage of the second battery BA2 is used as the charging upper limit voltage (refer to S77 in FIG. 11), and the maximum charge power of the first battery BA1 is calculated based on the charging upper limit voltage (refer to S78). However, the present disclosure is not limited thereto. According to the present embodiment, for example, when the deterioration upper limit voltage is higher than the open-circuit voltage of the second battery BA2, the charging upper limit voltage and the open-circuit voltage of the second battery BA2 become equal to each other. Therefore, the maximum charge power of the first battery BA1 is set such that the closed-circuit voltage of the first battery BA1 during charging becomes equal to the open-circuit voltage of the second battery BA2.

Here, for example, the maximum charge power of the first battery BA1 may be set such that the closed-circuit voltage of the first battery BA1 during charging becomes lower than the open-circuit voltage of the second battery BA2 at all times. This can be realized in the processing in S77 by setting a predetermined margin voltage as the open-circuit voltage of the second battery BA2. That is, in S77, the lower voltage of the deterioration upper limit voltage and a voltage obtained by subtracting a positive margin voltage from the open-circuit voltage of the second battery BA2 is used as the charging upper limit voltage. Accordingly, the charging upper limit voltage can be lower than the open-circuit voltage of the second battery BA2 at all times.

Other Configurations

According to an embodiment of the present disclosure, there is provided an electrically driven vehicle is provided to include an electric motor that is coupled to a driving wheel, a power converter that transmits and receives a power with respect to the electric motor, a first circuit to which the power converter and a first power storage device are connected, a second circuit to which a second power storage device is connected, a voltage converter that converts a voltage between the first circuit and the second circuit, and a control device that controls the power converter and the voltage converter. The control device performs controls in a manner that a range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device. The control device performs controls in a manner when one of the first and second power storage devices serves as a charging target power storage device, the other serves as a non-charging target power storage device, a regenerative power output from the power converter to the first circuit is supplied to the charging target power storage device, and the charging target power storage device is charged, the control device calculates an upper limit power with respect to the regenerative power output from the power converter to the first circuit based on an open-circuit voltage of the non-charging target power storage device and controls the power converter and the voltage converter such that the regenerative power does not exceed the upper limit power.

(2) In the above electrically driven vehicle, the control device calculates the upper limit power such that a closed-circuit voltage of the charging target power storage device during charging becomes equal to or lower than the open-circuit voltage of the non-charging target power storage device.

(3) In the above electrically driven vehicle, the control device calculates the upper limit power such that the closed-circuit voltage of the charging target power storage device during charging becomes equal to the open-circuit voltage of the non-charging target power storage device.

(4) In the above electrically driven vehicle, the range of use with respect to the first open-circuit voltage is higher than the range of use with respect to the second open-circuit voltage. The charging target power storage device is the second power storage device, and the non-charging target power storage device be the first power storage device. The control device includes a deterioration upper limit voltage calculation unit that calculates a deterioration upper limit voltage, which is an upper limit voltage with respect to the second closed-circuit voltage during charging, such that the second power storage device does not deteriorate based on a state of the second power storage device; and an upper limit power calculation unit that calculates the upper limit power based on a power to be consumed to charge the second power storage device when the second closed-circuit voltage is used as a charging upper limit voltage that is a lower voltage selected from the deterioration upper limit voltage and the first open-circuit voltage, and a charging current corresponding to a difference between the charging upper limit voltage and the second open-circuit voltage is supplied to the second power storage device.

(5) In the above electrically driven vehicle, the range of use with respect to the second open-circuit voltage is higher than the range of use with respect to the first open-circuit voltage. The charging target power storage device is the first power storage device, and the non-charging target power storage device is the second power storage device. The control device includes a deterioration upper limit voltage calculation unit that calculates a deterioration upper limit voltage, which is an upper limit voltage with respect to the first closed-circuit voltage during charging, such that the first power storage device does not deteriorate based on a state of the first power storage device; and an upper limit power calculation unit that calculates the upper limit power based on a power to be consumed to charge the first power storage device when the first closed-circuit voltage is used as a charging upper limit voltage that is a lower voltage of the deterioration upper limit voltage and the second open-circuit voltage, and a charging current corresponding to a difference between the charging upper limit voltage and the first open-circuit voltage is supplied to the first power storage device.

(6) In the above electrically driven vehicle, the electrically driven vehicle further includes a mechanical braking device (for example, a mechanical braking device 5 as described above) which applies a mechanical braking force to the driving wheel. The control deice acquires a request braking force with respect to a braking force to be applied to the driving wheel. When a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

Here, "a request parameter indicating a magnitude of the request braking force" need only be a physical quantity which increases when the request braking force increases, and any physical quantity may be adopted regardless of its dimension. For example, the request parameter may be the request braking force itself and may be a physical quantity obtained by converting the request braking force into a power, that is, a request regenerative power which is a regenerative power output from the power converter to the first circuit when it is intended to achieve the request braking force with only a regenerative braking force applied to the driving wheel by a motor generator. In addition, "an upper limit parameter indicating a magnitude of the upper limit power" is a physical quantity which increases when the upper limit power increases and is a physical quantity having the same dimension as the request parameter. For example, the upper limit parameter is the upper limit power itself or a physical quantity obtained by converting the upper limit power into a force, that is, an upper limit regenerative braking force which is a regenerative braking force applied from the motor generator to the driving wheel when the power converter is controlled such that the regenerative power output from the power converter to the first circuit becomes the upper limit power. For example, when the request parameter is set using the request braking force, the upper limit parameter becomes the upper limit regenerative braking force, and when the request parameter is set using the request regenerative power, the upper limit parameter becomes the upper limit power.

(7) According to another embodiment of the present disclosure, an electrically driven vehicle (for example, a vehicle V as described above) is provide to include an electric motor that is coupled to a driving wheel, a power converter that transmits and receives a power with respect to the electric motor, a first circuit to which the power converter and a first power storage device are connected, a second circuit to which a second power storage device is connected, a voltage converter that converts a voltage between the first circuit and the second circuit, and a control device that controls the power converter and the voltage converter. A range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device. When one of the first and second power storage devices serves as a discharging target power storage device, the other serves as a non-discharging target power storage device, a power output from the discharging target power storage device is supplied to the power converter, and the electric motor is driven, the control device calculates an upper limit power with respect to a driving power output from the first circuit to the power converter based on an open-circuit voltage of the non-discharging target power storage device and controls the power converter and the voltage converter such that the driving power does not exceed the upper limit power.

(8) In the above electrically driven vehicle, the control device calculates the upper limit power such that a closed-circuit voltage of the discharging target power storage device during discharging becomes equal to or higher than the open-circuit voltage of the non-discharging target power storage device.

(9) In the above electrically driven vehicle, the control device calculates the upper limit power such that the closed-circuit voltage of the discharging target power storage device during discharging becomes equal to the open-circuit voltage of the non-discharging target power storage device.

(10) In the above electrically driven vehicle, the range of use with respect to the first open-circuit voltage is higher than the range of use with respect to the second open-circuit voltage. The discharging target power storage device is the first power storage device, and the non-discharging target power storage device be the second power storage device. The control device includes a deterioration lower limit voltage calculation unit that calculates a deterioration lower limit voltage, which is a lower limit voltage with respect to the first closed-circuit voltage during discharging, such that the first power storage device does not deteriorate based on a state of the first power storage device; and an upper limit power calculation unit that calculates the upper limit power based on a power to be consumed to drive the electric motor when the first closed-circuit voltage is used as a discharging lower limit voltage that is a higher voltage of the deterioration lower limit voltage and the second open-circuit voltage, and a discharging current corresponding to a difference between the discharging lower limit voltage and the first open-circuit voltage is supplied to the power converter.

(11) In the above electrically driven vehicle, the range of use with respect to the second open-circuit voltage is higher than the range of use with respect to the first open-circuit voltage. The discharging target power storage device is the second power storage device, and the non-discharging target power storage device be the first power storage device. The control device includes a deterioration lower limit voltage calculation unit that calculates a deterioration lower limit voltage, which is a lower limit voltage with respect to the second closed-circuit voltage during discharging, such that the second power storage device does not deteriorate based on a state of the second power storage device; and an upper limit power calculation unit that calculates the upper limit power based on a power to be consumed to drive the electric motor when the second closed-circuit voltage is used as a discharging lower limit voltage that is a higher voltage of the deterioration lower limit voltage and the first open-circuit voltage, and a discharging current corresponding to a difference between the discharging lower limit voltage and the second open-circuit voltage is supplied to the power converter.

(1) The electrically driven vehicle of the present disclosure includes the first and second power storage devices which do not overlap each other in the range of use with respect to the open-circuit voltage and overlap each other in the range of use with respect to the closed-circuit voltage, the first circuit in which the power converter and the first power storage device are provided, the second circuit in which the second power storage device is provided, and the voltage converter which converts a voltage between these two circuits having different voltages. In such an electrically driven vehicle, for example, when the charging target power storage device which is one of the first and second power storage devices is charged using a regenerative power output from the power converter to the first circuit, there are cases where the closed-circuit voltage of the charging target power storage device and the open-circuit voltage of the non-charging target power storage device are approximate to each other and a charging current flows into the non-charging target power storage device, so that the non-charging target power storage device deteriorates. Here, when the regenerative power output from the power converter to the first circuit is supplied to the charging target power storage device and this charging target power storage device is charged, the control device calculates the upper limit power with respect to the regenerative power based on the open-circuit voltage of the non-charging target power storage device and controls the power converter and the voltage converter such that the regenerative power does not exceed this upper limit power. Accordingly, in the electrically driven vehicle, when the vehicle decelerates, the charging target power storage device can be charged using a regenerative power generated by the electric motor, while an unintended charging current is inhibited from flowing to the non-charging target power storage device.

(2) In the electrically driven vehicle of the present disclosure, the control device calculates the upper limit power such that the closed-circuit voltage of the charging target power storage device during charging becomes equal to or lower than the open-circuit voltage of the non-charging target power storage device. Accordingly, in the electrically driven vehicle, when the vehicle decelerates, the charging target power storage device can be charged using a regenerative power generated by the electric motor, while an unintended charging current is inhibited from flowing to the non-charging target power storage device.

(3) In the electrically driven vehicle of the present disclosure, the control device calculates the upper limit power such that the closed-circuit voltage of the charging target power storage device during charging becomes equal to the open-circuit voltage of the non-charging target power storage device. Accordingly, in the electrically driven vehicle, as many regenerative powers as possible can be generated during deceleration and the charging target power storage device can be charged using this regenerative power, while an unintended charging current is inhibited from flowing to the non-charging target power storage device.

(4) In the electrically driven vehicle of the present disclosure, the range of use with respect to the first open-circuit voltage is set to be higher than the range of use with respect to the second open-circuit voltage. The charging target power storage device serves as the second power storage device, and the non-charging target power storage device serves as the first power storage device. The deterioration upper limit voltage calculation unit calculates the deterioration upper limit voltage that is an upper limit voltage with respect to the second closed-circuit voltage during charging such that the second power storage device does not deteriorate. In addition, the upper limit power calculation unit defines the lower voltage of the deterioration upper limit voltage and the first open-circuit voltage as the charging upper limit voltage and calculates the upper limit power based on a power to be consumed to charge the second power storage device when the second closed-circuit voltage during charging is used as this charging upper limit voltage and a charging current corresponding to the difference between the charging upper limit voltage and the second open-circuit voltage is supplied to the second power storage device. Accordingly, in the electrically driven vehicle, as many regenerative powers as possible can be generated during deceleration and the second power storage device can be charged using this regenerative power, while an unintended charging current is inhibited from flowing to the first power storage device. In addition, since the second closed-circuit voltage during charging the second power storage device is equal to or lower than the deterioration upper limit voltage, the second power storage device can also be inhibited from deteriorating due to charging.

(5) In the electrically driven vehicle of the present disclosure, the range of use with respect to the second open-circuit voltage is set to be higher than the range of use with respect to the first open-circuit voltage. The charging target power storage device serves as the first power storage device, and the non-charging target power storage device serves as the second power storage device. The deterioration upper limit voltage calculation unit calculates the deterioration upper limit voltage that is an upper limit voltage with respect to the first closed-circuit voltage during charging such that the first power storage device does not deteriorate. In addition, the upper limit power calculation unit defines the lower voltage of the deterioration upper limit voltage and the second open-circuit voltage as the charging upper limit voltage and calculates the upper limit power based on a power to be consumed to charge the first power storage device when the first closed-circuit voltage is used as this charging upper limit voltage and a charging current corresponding to the difference between the charging upper limit voltage and the first open-circuit voltage is supplied to the first power storage device. Accordingly, in the electrically driven vehicle, as many regenerative powers as possible can be generated during deceleration and the first power storage device can be charged using this regenerative power, while an unintended charging current is inhibited from flowing to the second power storage device. In addition, since the first closed-circuit voltage during charging the first power storage device is equal to or lower than the deterioration upper limit voltage, the first power storage device can also be inhibited from deteriorating due to charging.

(6) In the electrically driven vehicle of the present disclosure, when a request braking force with respect to the braking force to be applied to the driving wheel is acquired and the request parameter indicating the magnitude of the request braking force is larger than the upper limit parameter indicating the magnitude of the upper limit power, the mechanical braking device is controlled such that the mechanical braking force of the mechanical braking device reaches a magnitude corresponding to the difference between the request parameter and the upper limit parameter. Accordingly, the mechanical braking device can be controlled such that a braking force corresponding to a request is applied to the driving wheel, while the charging target power storage device is charged using as many regenerative powers as possible during deceleration.

(7) The electrically driven vehicle of the present disclosure includes the first and second power storage devices which do not overlap each other in the range of use with respect to the open-circuit voltage and overlap each other in the range of use with respect to the closed-circuit voltage, the first circuit in which the power converter and the first power storage device are provided, the second circuit in which the second power storage device is provided, and the voltage converter which converts a voltage between these two circuits having different voltages. In such an electrically driven vehicle, for example, when the power output from the discharging target power storage device which is one of the first and second power storage devices is supplied to the power converter and the electric motor is driven, there are cases where the closed-circuit voltage of the discharging target power storage device and the open-circuit voltage of the non-discharging target power storage device are approximate to each other and a discharging current unintentionally flows from the non-discharging target power storage device. Here, when the electric motor is driven using a power output from the discharging target power storage device, while discharging from the non-discharging target power storage device is inhibited, the control device calculates the upper limit power with respect to a driving power output from the first circuit to the power converter based on the open-circuit voltage of the non-discharging target power storage device and controls the power converter and the voltage converter such that the driving power does not exceed this upper limit power. Accordingly, in the electrically driven vehicle, during acceleration or constant speed traveling, the electric motor can be driven using a power discharged from the discharging target power storage device, while an unintended discharging current is inhibited from flowing from the non-discharging target power storage device.

(8) In the electrically driven vehicle of the present disclosure, the control device calculates the upper limit power such that the closed-circuit voltage of the discharging target power storage device during discharging becomes equal to or higher than the open-circuit voltage of the non-discharging target power storage device. Accordingly, in the electrically driven vehicle, during acceleration or constant speed traveling, the electric motor can be driven using a power discharged from the discharging target power storage device, while an unintended discharging current is inhibited from flowing from the non-discharging target power storage device.

(9) In the electrically driven vehicle of the present disclosure, the control device calculates the upper limit power such that the closed-circuit voltage of the discharging target power storage device during discharging becomes equal to the open-circuit voltage of the non-discharging target power storage device. Accordingly, in the electrically driven vehicle, as many powers as possible can be supplied to the power converter during acceleration or constant speed traveling and the electric motor can be driven, while an unintended discharging current is inhibited from flowing from the non-discharging target power storage device.

(10) In the electrically driven vehicle of the present disclosure, the range of use with respect to the first open-circuit voltage is set to be higher than the range of use with respect to the second open-circuit voltage. The discharging target power storage device serves as the first power storage device, and the non-discharging target power storage device serves as the second power storage device. The deterioration lower limit voltage calculation unit calculates the deterioration lower limit voltage that is a lower limit voltage with respect to the first closed-circuit voltage during discharging such that the first power storage device does not deteriorate. In addition, the upper limit power calculation unit defines the higher voltage of the deterioration lower limit voltage and the second open-circuit voltage as the discharging lower limit voltage and calculates the upper limit power based on a power to be consumed to drive the electric motor when the first closed-circuit voltage is used as this discharging lower limit voltage and a discharging current corresponding to the difference between the discharging lower limit voltage and the first open-circuit voltage is supplied to the power converter. Accordingly, in the electrically driven vehicle, as many powers as possible can be supplied to the power converter during acceleration or constant speed traveling and the electric motor can be driven using this power, while an unintended discharging current is inhibited from flowing from the second power storage device. In addition, since the first closed-circuit voltage during discharging the first power storage device is equal to or higher than the deterioration lower limit voltage, the first power storage device can also be inhibited from deteriorating due to discharging.

(11) In the electrically driven vehicle of the present disclosure, the range of use with respect to the second open-circuit voltage is set to be higher than the range of use with respect to the first open-circuit voltage. The discharging target power storage device serves as the second power storage device, and the non-discharging target power storage device serves as the first power storage device. The deterioration lower limit voltage calculation unit calculates the deterioration lower limit voltage that is a lower limit voltage with respect to the second closed-circuit voltage during discharging such that the second power storage device does not deteriorate. In addition, the upper limit power calculation unit defines the higher voltage of the deterioration lower limit voltage and the first open-circuit voltage as the discharging lower limit voltage and calculates the upper limit power based on a power to be consumed to drive the electric motor when the second closed-circuit voltage is used as this discharging lower limit voltage and a discharging current corresponding to the difference between the discharging lower limit voltage and the second open-circuit voltage is supplied to the power converter. Accordingly, in the electrically driven vehicle, as many powers as possible can be supplied to the power converter during acceleration or constant speed traveling and the electric motor can be driven using this power, while an unintended discharging current is inhibited from flowing from the first power storage device. In addition, since the second closed-circuit voltage during discharging the second power storage device is equal to or higher than the deterioration lower limit voltage, the second power storage device can also be inhibited from deteriorating due to discharging.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrically driven vehicle comprising:
an electric motor that is coupled to a driving wheel;
a power converter that transmits and receives a power with respect to the electric motor;
a first circuit to which the power converter and a first power storage device are connected;
a second circuit to which a second power storage device is connected;
a voltage converter that converts a voltage between the first circuit and the second circuit; and
a control device,
in a case that a range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device,
the control device that controls the power converter and the voltage converter in the following manners such that, when one of the first and second power storage devices serves as a charging target power storage device and the other serves as a non-charging target power storage device, a regenerative power output from the power converter to the first circuit is supplied to the charging target power storage device, and the charging target power storage device is charged, the control device calculates an upper limit power with respect to the regenerative power output from the power converter to the first circuit based on an open-circuit voltage of the non-charging target power storage device and controls the power converter and the voltage converter such that the regenerative power does not exceed the upper limit power.

2. The electrically driven vehicle according to claim 1, wherein
the control device calculates the upper limit power such that a closed-circuit voltage of the charging target power storage device during charging becomes equal to or lower than the open-circuit voltage of the non-charging target power storage device.

3. The electrically driven vehicle according to claim 2, further comprising:
a mechanical braking device that applies a mechanical braking force to the driving wheel,
wherein the control device acquires a request braking force with respect to a braking force to be applied to the driving wheel, and
when a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

4. The electrically driven vehicle according to claim 2, wherein
the control device calculates the upper limit power such that the closed-circuit voltage of the charging target power storage device during charging becomes equal to the open-circuit voltage of the non-charging target power storage device.

5. The electrically driven vehicle according to claim 4, wherein
the range of use with respect to the first open-circuit voltage is higher than the range of use with respect to the second open-circuit voltage,
the charging target power storage device is the second power storage device, and the non-charging target power storage device is the first power storage device, and
the control device includes:
a deterioration upper limit voltage calculation unit that calculates a deterioration upper limit voltage, which is an upper limit voltage with respect to the second closed-circuit voltage during charging, such that the second power storage device does not deteriorate based on a state of the second power storage device, and
an upper limit power calculation unit that calculates the upper limit power based on a power to be consumed to charge the second power storage device when the second closed-circuit voltage is used as a charging upper limit voltage that is a lower voltage of the deterioration upper limit voltage and the first open-circuit voltage, and a charging current corresponding to a difference between the charging upper limit voltage and the second open-circuit voltage is supplied to the second power storage device.

6. The electrically driven vehicle according to claim 5, further comprising:
a mechanical braking device that applies a mechanical braking force to the driving wheel,
wherein the control device acquires a request braking force with respect to a braking force to be applied to the driving wheel, and
when a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

7. The electrically driven vehicle according to claim 4, wherein
the range of use with respect to the second open-circuit voltage is higher than the range of use with respect to the first open-circuit voltage,
the charging target power storage device is the first power storage device, and the non-charging target power storage device is the second power storage device, and
the control device includes:
a deterioration upper limit voltage calculation unit that calculates a deterioration upper limit voltage, which is an upper limit voltage with respect to the first closed-circuit voltage during charging such that the first power storage device does not deteriorate based on a state of the first power storage device, and
an upper limit power calculation unit that calculates the upper limit power based on a power to be consumed to charge the first power storage device when the first closed-circuit voltage is used as a charging upper limit voltage that is a lower voltage of the deterioration upper limit voltage and the second open-circuit voltage, and a charging current corresponding to a difference between the charging upper limit voltage and the first open-circuit voltage is supplied to the first power storage device.

8. The electrically driven vehicle according to claim 7, further comprising:
a mechanical braking device that applies a mechanical braking force to the driving wheel,
wherein the control device acquires a request braking force with respect to a braking force to be applied to the driving wheel, and
when a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

9. The electrically driven vehicle according to claim 4, further comprising:
a mechanical braking device that applies a mechanical braking force to the driving wheel,
wherein the control device acquires a request braking force with respect to a braking force to be applied to the driving wheel, and
when a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

10. The electrically driven vehicle according to claim 1, further comprising:
a mechanical braking device that applies a mechanical braking force to the driving wheel,
wherein the control device acquires a request braking force with respect to a braking force to be applied to the driving wheel, and
when a request parameter indicating a magnitude of the request braking force is larger than an upper limit parameter indicating a magnitude of the upper limit power, the control device controls the mechanical braking device such that the mechanical braking force reaches a magnitude corresponding to a difference between the request parameter and the upper limit parameter.

11. An electrically driven vehicle comprising:
an electric motor which is coupled to a driving wheel;
a power converter that transmits and receives a power with respect to the electric motor;
a first circuit to which the power converter and a first power storage device are connected;
a second circuit to which a second power storage device is connected;
a voltage converter that converts a voltage between the first circuit and the second circuit; and
a control device,
in a case that a range of use with respect to a first open-circuit voltage that is an open-circuit voltage of the first power storage device does not overlap a range of use with respect to a second open-circuit voltage that is an open-circuit voltage of the second power storage device, and a range of use with respect to a first closed-circuit voltage that is a closed-circuit voltage of the first power storage device overlaps a range of use with respect to a second closed-circuit voltage that is a closed-circuit voltage of the second power storage device,
the control device controls the power converter and the voltage converter in the following manners such that, when one of the first and second power storage devices serves as a discharging target power storage device and the other serves as a non-discharging target power storage device, a power output from the discharging target power storage device is supplied to the power converter, and the electric motor is driven, the control device calculates an upper limit power with respect to a driving power output from the first circuit to the power converter based on an open-circuit voltage of the non-discharging target power storage device and controls the power converter and the voltage converter such that the driving power does not exceed the upper limit power.

12. The electrically driven vehicle according to claim 11, wherein
the control device calculates the upper limit power such that a closed-circuit voltage of the discharging target power storage device during discharging becomes equal to or higher than the open-circuit voltage of the non-discharging target power storage device.

13. The electrically driven vehicle according to claim 12, wherein
the control device calculates the upper limit power such that the closed-circuit voltage of the discharging target power storage device during discharging becomes equal to the open-circuit voltage of the non-discharging target power storage device.

14. The electrically driven vehicle according to claim 13, wherein
the range of use with respect to the first open-circuit voltage is higher than the range of use with respect to the second open-circuit voltage,
the discharging target power storage device is the first power storage device, and the non-discharging target power storage device is the second power storage device, and
the control device includes:
a deterioration lower limit voltage calculation unit that calculates a deterioration lower limit voltage, which is a lower limit voltage with respect to the first closed-circuit voltage during discharging, such that the first power storage device does not deteriorate based on a state of the first power storage device, and
an upper limit power calculation unit which calculates the upper limit power based on a power to be consumed to drive the electric motor when the first closed-circuit voltage is used as a discharging lower limit voltage that is a higher voltage of the deterioration lower limit voltage and the second open-circuit voltage, and a discharging current corresponding to a difference between the discharging lower limit voltage and the first open-circuit voltage is supplied to the power converter.

15. The electrically driven vehicle according to claim 13, wherein
the range of use with respect to the second open-circuit voltage is higher than the range of use with respect to the first open-circuit voltage, the discharging target power storage device is the second power storage device, and the non-discharging target power storage device is the first power storage device, and the control device includes:
- a deterioration lower limit voltage calculation unit that calculates a deterioration lower limit voltage, which is a lower limit voltage with respect to the second closed-circuit voltage during discharging, such that the second power storage device does not deteriorate based on a state of the second power storage device, and
- an upper limit power calculation unit that calculates the upper limit power based on a power to be consumed to drive the electric motor when the second closed-circuit voltage is used as a discharging lower limit voltage that is a higher voltage of the deterioration lower limit voltage and the first open-circuit voltage, and a discharging current corresponding to a difference between the discharging lower limit voltage and the second open-circuit voltage is supplied to the power converter.

\* \* \* \* \*